United States Patent
Kazmi et al.

(10) Patent No.: US 11,290,893 B2
(45) Date of Patent: Mar. 29, 2022

(54) SYSTEMS AND METHODS FOR IDENTIFYING CE LEVEL MISMATCH

(71) Applicant: Telefonaktiebolaget LM Ericsson (publ), Stockholm (SE)

(72) Inventors: Muhammad Kazmi, Sundbyberg (SE); Iana Siomina, Täby (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 53 days.

(21) Appl. No.: 16/482,494

(22) PCT Filed: Feb. 1, 2018

(86) PCT No.: PCT/SE2018/050076
§ 371 (c)(1),
(2) Date: Jul. 31, 2019

(87) PCT Pub. No.: WO2018/143877
PCT Pub. Date: Aug. 9, 2018

(65) Prior Publication Data
US 2020/0015097 A1 Jan. 9, 2020

Related U.S. Application Data

(60) Provisional application No. 62/454,314, filed on Feb. 3, 2017.

(51) Int. Cl.
*H04W 16/26* (2009.01)
*H04W 24/10* (2009.01)
(Continued)

(52) U.S. Cl.
CPC .......... *H04W 16/26* (2013.01); *H04B 17/336* (2015.01); *H04W 4/70* (2018.02); *H04W 24/10* (2013.01)

(58) Field of Classification Search
CPC ....... H04W 16/26; H04W 24/10; H04W 4/70; H04B 17/336
(Continued)

(56) References Cited

U.S. PATENT DOCUMENTS

2016/0150570 A1    5/2016    Wang et al.

FOREIGN PATENT DOCUMENTS

| EP | 3 094 146 A1 | 11/2016 |
|---|---|---|
| WO | 2016 10733 A1 | 7/2016 |

(Continued)

OTHER PUBLICATIONS

PCT International Search Report for international application No. PCT/SE2018/050076—dated Jun. 1, 2018.
(Continued)

*Primary Examiner* — Angel T Brockman
(74) *Attorney, Agent, or Firm* — Christopher & Weisberg, P.A.

(57) ABSTRACT

According to certain embodiments, a method in a wireless device includes determining a current coverage enhancement, CE, mode of the wireless device with respect to a first cell and determining an estimated signal quality of the wireless device with respect to the first cell. If the current CE mode is a normal CE mode and the estimated signal quality of the wireless device with respect to the first cell is greater than or equal to an upper threshold, the wireless devices continues to operate in the normal CE mode. If the current CE mode is an enhanced CE mode and the estimated signal quality of the wireless device with respect to the first cell is greater than or equal to a lower threshold and less than the upper threshold, the wireless device continues to operate in the enhanced CE mode. If the current CE mode is the normal CE mode and the estimated signal quality of the wireless device with respect to the first cell is greater than or equal
(Continued)

to the lower threshold and less than the upper threshold, the wireless device is reconfigured to operate in the enhanced CE mode. If the current CE mode is the enhanced CE mode and the estimated signal quality of the wireless device with respect to the first cell is greater than or equal to the upper threshold, the wireless device continues to operate in the enhanced CE mode.

15 Claims, 16 Drawing Sheets

(51) Int. Cl.
 *H04W 4/70* (2018.01)
 *H04B 17/336* (2015.01)
(58) Field of Classification Search
 USPC .......................................................... 370/329
 See application file for complete search history.

(56) References Cited

FOREIGN PATENT DOCUMENTS

| WO | 2016 128097 A1 | 8/2016 |
| WO | 2016 167570 A1 | 10/2016 |
| WO | 2016 204556 A1 | 12/2016 |

OTHER PUBLICATIONS

PCT Written Opinion of the International Searching Authority for International application No. PCT/SE2018/050076—dated Jun. 1, 2018.

3GPP TS 36.331 V13.3.0; 3rd Generation Partnership Project; Technical Specification Group Radio Access Network; Evolved Universal Terrestrial Radio Access (E-UTRA); Radio Source Control (RRC); protocol specification (Release 13), Sep. 2016, consisting of 627-pages.

3GPP TS 36.331 V13.3.0; 3rd Generation Partnership Project; Technical Specification Group Radio Access Network; Evolved Universal Terrestrial Radio Access (E-UTRA); Physical channels and modulation (Release 13), Jun. 2016, consisting of 168-pages.

SYSTEMS AND METHODS FOR IDENTIFYING CE LEVEL MISMATCH

PRIORITY

This nonprovisional application is a U.S. National Stage Filing under 35 U.S.C. § 371 of International Patent Application Serial No. PCT/SE2018/050076 filed Feb. 1, 2018 and entitled "SYSTEMS AND METHODS FOR IDENTIFYING CE LEVEL MISMATCH" which claims priority to U.S. Provisional Patent Application No. 62/454,314 filed Feb. 3, 2017 both of which are hereby incorporated by reference in their entirety.

TECHNICAL FIELD

The present disclosure relates, in general, to wireless communications and, more particularly, systems and methods for identifying coverage enhancement (CE) level mismatch.

BACKGROUND

The Machine-Type-Communication (MTC) device is expected to be of low cost and low complexity. A low complexity user equipment (UE) envisages for machine-to-machine (M2M) operation may implement one or more low cost features like, smaller downlink and uplink maximum transport block size (e.g. 1400 bits) and/or reduced downlink channel bandwidth of 1.4 MHz for data channel (e.g., Physical Data Shared Channel (PDSCH)). A low cost UE may also comprise of a half-duplex frequency division duplex (HD-FDD) and one or more of the following additional features: single receiver (1 Rx) at the UE, smaller downlink and/or uplink maximum transport block size (e.g. 1400 bits) and reduced downlink channel bandwidth of 1.4 MHz for data channel. The low cost UE may also be termed as low complexity UE.

The path loss between the M2M device and the base station can be very large in some scenarios such as when used as a sensor or metering device located in a remote location such as in the basement of the building. In such scenarios, the reception of signal from base station is very challenging. For example, the path loss can be worse than 20 dB compared to normal cellular network operation. In order to cope with these challenges, the coverage in uplink and/or in downlink has to be substantially enhanced. This is realized by employing one or plurality of advanced techniques in the UE and/or in the radio network node for enhancing the coverage. Some non-limiting examples of such advanced techniques are (but not limited to) transmit power boosting, repetition of transmitted signal, applying additional redundancy to the transmitted signal, use of advanced/enhanced receiver etc. In general, when employing such coverage enhancing techniques, the M2M is regarded to be operating in 'coverage enhancing mode'.

A low complexity MTC UE (e.g. UE with 1 Rx) may also be capable of supporting enhanced coverage mode of operation aka coverage enhanced mode B (CEModeB). The normal coverage mode of operation is also called as coverage enhanced mode A (CEModeA).

Configuration of Coverage Enhancement Level

The enhanced MTC (eMTC) or further enhanced MTC (FeMTC) UE can be configured via Radio Resource Control (RRC) with one of the two possible coverage enhancement levels i.e. CEModeA or CEModeB. The CEModA and CEModeB are associated with different number of repetitions used in downlink (DL) and/or uplink (UL) physical channels as signalled in the following RRC message in TS 36.331 v13.3.2.

```
PDSCH-ConfigCommon-v1910 ::=   SEQUENCE {
    pdsch-maxNumRepetitionCEmodeA-r13   ENUMERATED {
        r16, r32 }        OPTIONAL,   -- Need OR
    pdsch-maxNumRepetitionCEmodeB-r13   ENUMERATED {
        r192, r256, r384, r512, r768, r1024,
        r1536, r2048}        OPTIONAL   --
Need OR
}
``` pdsch-maxNumRepetitionCEmodeA indicates the set of PDSCH repetition numbers for CE mode A and pdsch-maxNumRepetitionCEmodeB indicates the set of PDSCH repetition numbers for CE mode B.

```
PUSCH-ConfigCommon-v1910 ::=   SEQUENCE {
    pusch-maxNumRepetitionCEmodeA-r13        ENUMERATED {
                                             r8, r16, r32 }      OPTIONAL,  --
Need OR
    pusch-maxNumRepetitionCEmodeB-r13        ENUMERATED {
                                             r192, r256, r384, r512, r768, r1024,
                                             r1536, r2048        OPTIONAL,  --
Need OR
``` pusch-maxNumRepetitionCEmodeA indicates the set of PUSCH repetition numbers for CE mode A.
pusch-maxNumRepetitionCEmodeB indicates the set of PUSCH repetition numbers for CE mode B.

But if the UE is not configured in any of CEModeA and CEModeB then according to TS 36.211 v13.2.0 the UE shall assume the following CE level configuration:

If the Physical Random Access Channel (PRACH) coverage enhancement (CE) level is 0 or 1 then the UE shall assume CEModeA or if the PRACH coverage enhancement (CE) level is 2 or 3 then UE shall assume CEModeB.

The UE determines one of the 4 possible CE levels (0, 1, 2 and 3) during the random access procedure by comparing the DL radio measurement (e.g. Reference Signal Received Power (RSRP)) with the one or more thresholds signalled to the UE by the network node.

Narrow Band Internet of Things (NB-IOT)

The Narrow Band Internet of Things (NB-IOT) is a radio access for cellular internet of things (TOT), based to a great extent on a non-backward-compatible variant of Evolved Universal Terrestrial Radio Access (E-UTRA), that addresses improved indoor coverage, support for massive number of low throughput devices, low delay sensitivity, ultra-low device cost, low device power consumption and (optimized) network architecture.

The NB-IOT carrier bandwidth (Bw2) is 200 KHz. Examples of operating bandwidth (Bw1) of LTE are 1.4 MHz, 3 MHz, 5 MHz, 10 MHz, 15 MHz, 20 MHz etc.

NB-IoT supports 3 different deployment scenarios:
1. 'Stand-alone operation' utilizing for example the spectrum currently being used by Global System for Mobile Communications EDGE Radio Access Network (GERAN) systems as a replacement of one or more Global System for Mobile Communications (GSM) carriers. In principle, it operates on any carrier frequency which is neither within the carrier of another system not within the guard band of another system's operating carrier. The other system can be another NB-IOT operation or any other random access technology (RAT) such as, for example, LTE.
2. 'Guard band operation' utilizing the unused resource blocks within a LTE carrier's guard-band. The term guard band may also interchangeably called as guard bandwidth. As an example in case of LTE BW of 20 MHz (i.e. Bw1=20 MHz or 100 RBs), the guard band operation of NB-IOT can place anywhere outside the central 18 MHz but within 20 MHz LTE BW.
3. 'In-band operation' utilizing resource blocks within a normal LTE carrier. The in-band operation may also interchangeably be called in-bandwidth operation. More generally, the operation of one RAT within the BW of another RAT is also called as in-band operation. As an example, in a LTE BW of 50 RBs (i.e. Bw1=10 MHz or 50 RBs), NB-IOT operation over one resource block (RB) within the 50 RBs is called in-band operation.

In NB-IOT, the downlink transmission is based on Orthogonal Frequency Division Multiplexing (OFDM) with 15 kHz subcarrier spacing and same symbol and cyclic prefix durations as for legacy LTE for all the scenarios: standalone, guard-band, and in-band. For UL transmission, both multi-tone transmissions based with a 15 kHz subcarrier spacing on Single-carrier frequency-division multiple access (SC-FDMA), and single tone transmission, with either 3.75 kHz or 15 kHz subcarrier spacing, is supported.

In NB-IoT, anchor and non-anchor carriers are defined. In anchor carrier, the UE assumes that Narrow Band Primary Synchronization Signal (NPSS)/Narrowband Secondary Synchronization Signal (NSSS)/Narrowband Physical Broadcast Channel (NPBCH)/Scheduling Information Block-Narrowband (SIB-NB) are transmitted on downlink. In non-anchor carrier, the UE does not assume that NPSS/NSSS/NPBCH/SIB-NB are transmitted on downlink. The anchor carrier is transmitted on subframes #0, #4, #5 in every frame and subframe #9 in every other frame. The anchor carriers transmitting NPBCH/SIB-NB contains also Narrowband Reference Signal (NRS). The non-anchor carrier contains NRS and UE specific signals such as narrowband physical downlink control channel (NPDCCH) and narrowband physical downlink shared channel (NPDSCH). The non-anchor carrier can be transmitted in any subframe other than those containing the anchor carrier.

The MTC UE is configured with one of the coverage levels (CEModeA or CEModeB) in RRC connected state. The UE is further configured with certain number of repetitions for transmitting UL channel(s) such as Physical Uplink Shared Channel (PUSCH) and/or receiving DL channel(s) such as Physical Downlink Shared Channel (PDSCH). These configured repetitions are also associated with the configured CE level of the UE. However, the actual coverage of the UE with respect to a cell may change over time. In this case, the number of repetitions configured based on the configured CE level may become either insufficient or redundant. In the former case, the decoding of the DL channel at the UE will fail and/or the decoding of the UL channel at the eNodeB will fail. In the latter case, the DL radio resources will be wasted and/or the UL radio resources will be wasted. In the latter case, the UE power consumption may also increase due to unnecessary or redundant reception of the DL channel(s) and/or transmission of UL channel(s).

SUMMARY

To address the foregoing problems with existing solutions, disclosed is systems and methods for identifying coverage enhancement (CE) level mismatch. In certain embodiments, the systems and methods may be implemented in or by a wireless device, which may include a user equipment (UE), and/or a network node, which may include a eNodeB (eNB).

According to certain embodiments, a method in a wireless device includes determining a current coverage enhancement, CE, mode of the wireless device with respect to a first cell and determining an estimated signal quality of the wireless device with respect to the first cell. If the current CE mode is a normal CE mode and the estimated signal quality of the wireless device with respect to the first cell is greater than or equal to an upper threshold, the wireless devices continues to operate in the normal CE mode. If the current CE mode is an enhanced CE mode and the estimated signal quality of the wireless device with respect to the first cell is greater than or equal to a lower threshold and less than the upper threshold, the wireless device continues to operate in the enhanced CE mode. If the current CE mode is the normal CE mode and the estimated signal quality of the wireless device with respect to the first cell is greater than or equal to the lower threshold and less than the upper threshold, the wireless device is reconfigured to operate in the enhanced CE mode. If the current CE mode is the enhanced CE mode and the estimated signal quality of the wireless device with respect to the first cell is greater than or equal to the upper threshold, the wireless device continues to operate in the enhanced CE mode.

According to certain embodiments, a wireless device may include processing circuitry configured to determine a current coverage enhancement, CE, mode of the wireless device with respect to a first cell and determine an estimated signal quality of the wireless device with respect to the first cell. If the current CE mode is a normal CE mode and the estimated signal quality of the wireless device with respect to the first cell is greater than or equal to an upper threshold, the wireless devices continues to operate in the normal CE mode. If the current CE mode is an enhanced CE mode and the estimated signal quality of the wireless device with respect to the first cell is greater than or equal to a lower threshold and less than the upper threshold, the wireless device continues to operate in the enhanced CE mode. If the current CE mode is the normal CE mode and the estimated signal quality of the wireless device with respect to the first cell is greater than or equal to the lower threshold and less than the upper threshold, the wireless device is reconfigured to operate in the enhanced CE mode. If the current CE mode is the enhanced CE mode and the estimated signal quality of the wireless device with respect to the first cell is greater than or equal to the upper threshold, the wireless device continues to operate in the enhanced CE mode.

According to certain embodiments, method in a network node may include receiving, from a wireless device configured to operate in a first coverage enhancement, CE, mode with respect to a first cell. The information may indicate at least one of an estimated signal quality of the wireless device with respect to the first cell and a reconfiguration of the wireless device from the first CE mode to a second CE mode with respect to the first cell. One or more operational tasks may be performed based on the information.

According to certain embodiments, a network node may include processing circuitry configured to receive, from a wireless device configured to operate in a first coverage enhancement, CE, mode with respect to a first cell. The information may indicate at least one of an estimated signal quality of the wireless device with respect to the first cell and a reconfiguration of the wireless device from the first CE mode to a second CE mode with respect to the first cell. One or more operational tasks may be performed based on the information.

Certain embodiments of the present disclosure may provide one or more technical advantages. For example, certain embodiments may enable the wireless device to correctly determine the true coverage enhancement level of the wireless device with respect to a cell. Another technical advantage may be that certain embodiments enable efficient use of radio resources for transmitting and/or receiving channels. Still another technical advantage may be that certain embodiments enable the wireless device to more efficiently use its battery and/or reduce processing. Certain embodiments may allow for wireless devices of reduced complexity. Another advantage still may be that certain embodiments enable the network node to determine if there is any mismatch between the wireless device coverage with respect to a cell as was determined by the network node and actual wireless device coverage being experienced by the wireless device with respect to that cell.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Particular embodiments of the present disclosure may provide solutions for indicating and adjusting for coverage enhancement (CE) level mismatch. Particular embodiments are described in FIGS. 1-16 of the drawings, like numerals being used for like and corresponding parts of the various drawings.

Figure 1:
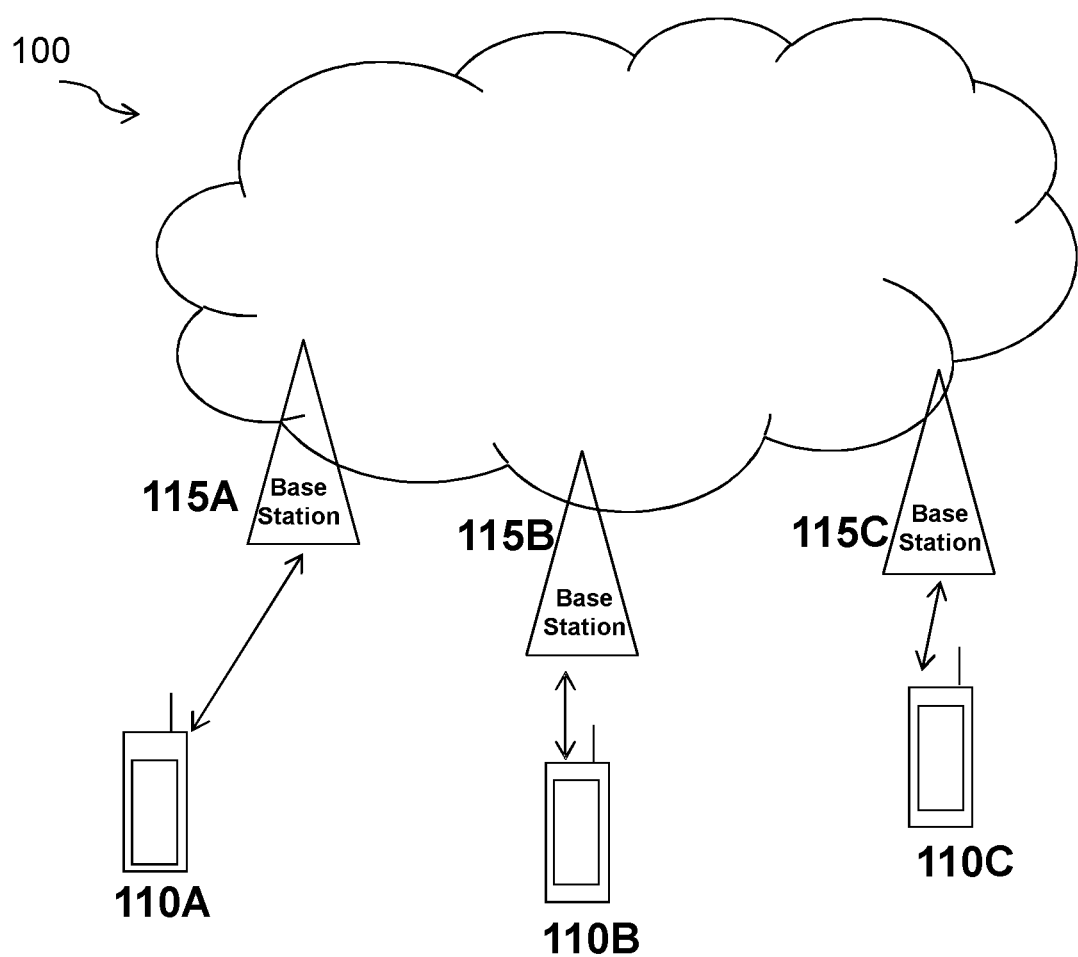
FIG. 1 illustrates an example wireless network, according to certain embodiments.

FIG. 1 illustrates a wireless network 100 for indicating and adjusting for CE level mismatch, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 1). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a target device, a device-to-device (D2D) capable device, a machine type communication (MTC) device or other UE capable of machine-to-machine (M2M) communication, a mobile phone or other terminal, a smart phone, a PDA (Personal Digital Assistant), a portable computer (e.g., laptop, tablet), a sensor, a modem, laptop embedded equipment (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, Master eNode B (MeNB), Secondary eNode B (SeNB), a network node belonging to Master cell group (MCG) or Secondary Cell Group (SCG), network controller, radio network controller (RNC), base station controller (BSC), relay donor node controlling relay, base transceiver station (BTS), access point (AP), transmission points, transmission nodes, Remote Radio Unit (RRU), Remote Radio Head (RRH), nodes in distributed antenna system (DAS), core network node (e.g. MSC, Mobility management entity (MME) etc.), O&M, OSS, Self-Organizing Networks (SON), positioning node (e.g. E-SMLC), Minimization of drive tests (MDT), test equipment, or any suitable network node. Example embodiments of wireless devices 110, network nodes 115, and other network nodes (such as radio network controller or core network node) are described in more detail with respect to FIGS. 2, 3, and 8, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any LTE based systems such as MTC, eMTC, and NB-IoT. As an example, MTC UE, eMTC UE, and NB-IoT UE may also be called UE category 0, UE category M1 and UE category NB1, respectively. However, the embodiments are applicable to any radio access technology (RAT) or multi-RAT systems in which the wireless device receives and/or transmits signals (e.g., data). For example, the various embodiments described herein may also be applicable to, LTE-Advanced, and LTE-U UMTS, LTE FDD/TDD, WCDMA/HSPA, GSM/GERAN, WiFi, WLAN, cdma2000, WiMax, 5G, New Radio (NR), another suitable radio access technology, or any suitable combination of one or more radio access technologies. It is noted that 5G, the fifth generation of mobile telecommunications and wireless technology is not yet fully defined but in an advanced draft stage with 3GPP. It includes work on 5G New Radio (NR) Access Technology. LTE terminology is used herein in a forward looking sense, to include equivalent 5G entities or functionalities although a different term may be specified in 5G. A general description of the agreements on 5G NR Access Technology is contained in most recent versions of the 3GPP 38-series Technical Reports. Although certain embodiments may be described in the context of wireless transmissions in the downlink, the present disclosure contemplates that the various embodiments are equally applicable in the uplink and vice versa. The described techniques are generally applicable for transmissions from both network nodes 115 and wireless devices 110.

Figure 2:
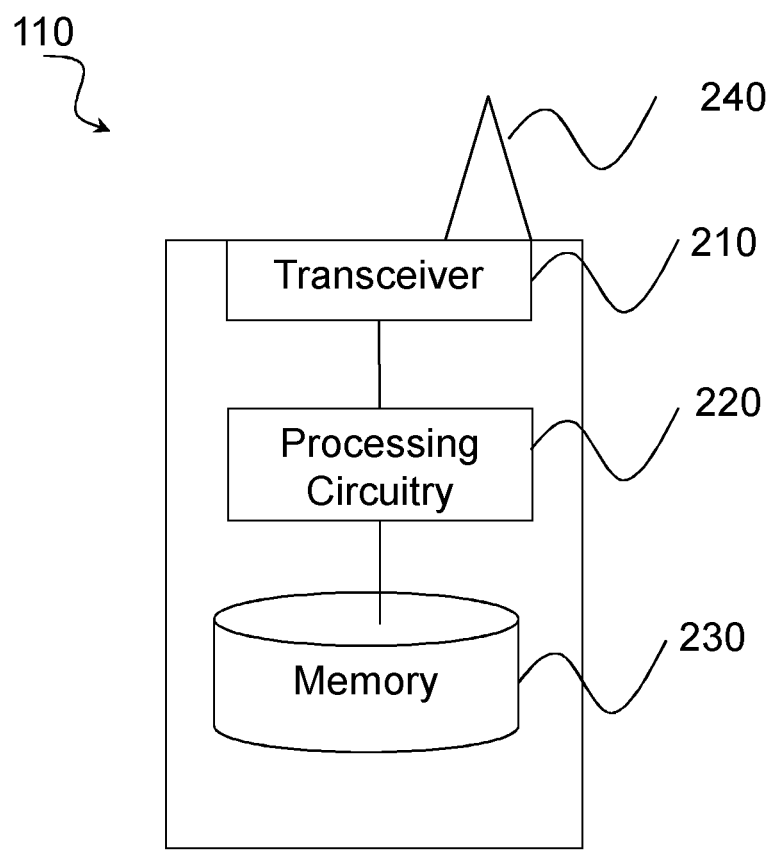
FIG. 2 illustrates an example wireless device, according to certain embodiments.

FIG. 2 illustrates an example wireless device 110 for indicating and adjusting for CE level mismatch, in accordance with certain embodiments. As depicted, wireless device 210 includes transceiver 210, processing circuitry 220, and memory 230. In some embodiments, transceiver 210 facilitates transmitting wireless signals to and receiving wireless signals from network node 115 (e.g., via an antenna 240), processing circuitry 220 executes instructions to provide some or all of the functionality described above as being provided by wireless device 110, and memory 230 stores the instructions executed by processing circuitry 220. Examples of a wireless device 110 are provided above.

Processing circuitry 220 may include any suitable combination of hardware and software implemented in one or more modules to execute instructions and manipulate data to perform some or all of the described functions of wireless device 110. In some embodiments, processing circuitry 220 may include, for example, one or more computers, one or more central processing units (CPUs), one or more processors, one or more microprocessors, one or more applications, and/or other logic.

Memory 230 is generally operable to store instructions, such as a computer program, software, an application including one or more of logic, rules, algorithms, code, tables, etc. and/or other instructions capable of being executed by processing circuitry. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

Other embodiments of wireless device 110 may include additional components beyond those shown in FIG. 2 that may be responsible for providing certain aspects of the wireless device's functionality, including any of the functionality described above and/or any additional functionality (including any functionality necessary to support the solution described above).

Figure 3:
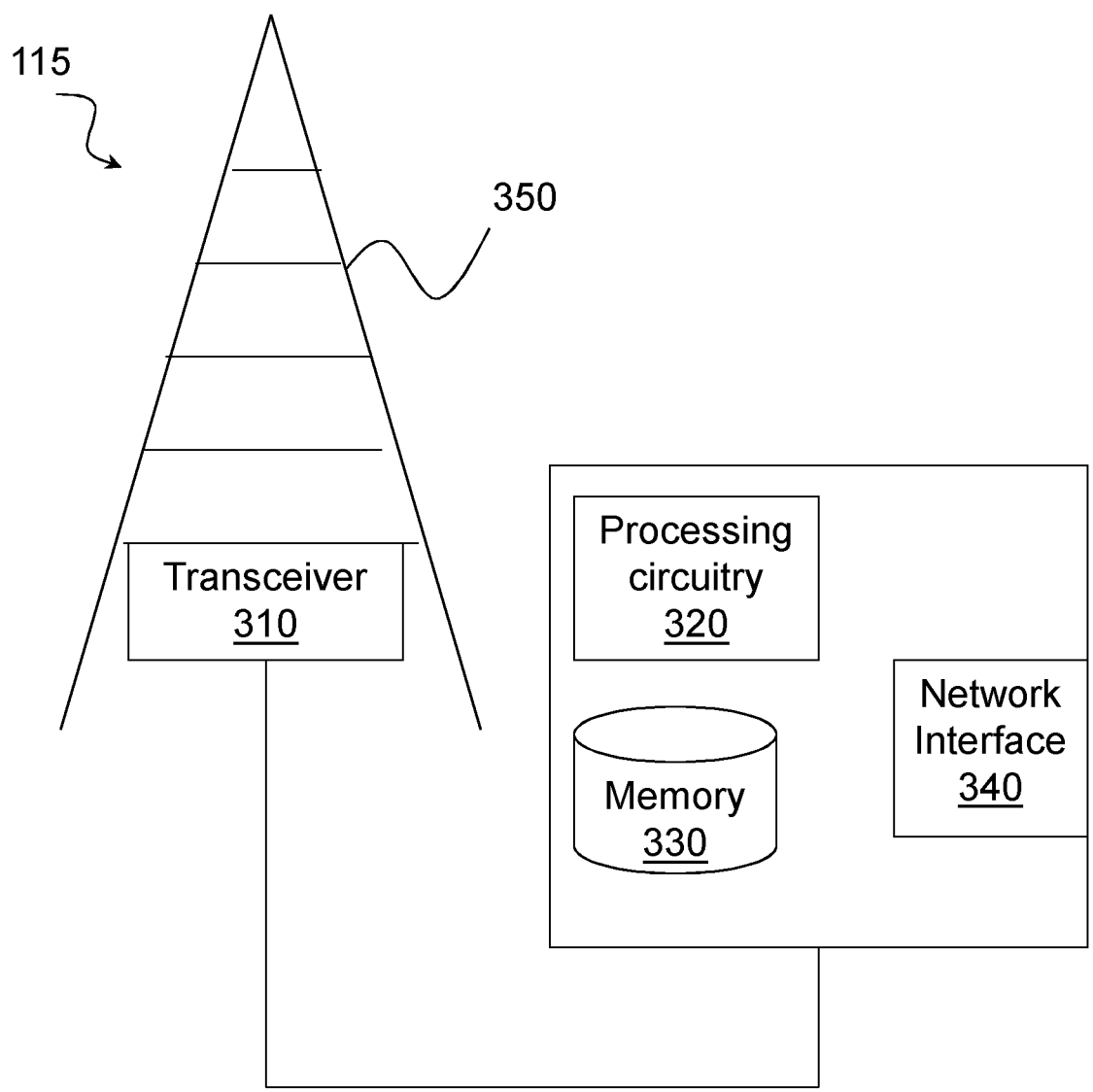
FIG. 3 illustrate an example network node, according to certain embodiments.

FIG. 3 illustrate an example network node 115 for indicating and/or adjusting for CE level mismatch, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 310, processing circuitry 320, memory 330, and network interface 340. In some embodiments, transceiver 310 facilitates transmitting wireless signals to and receiving wireless signals from wireless device 110 (e.g., via an antenna 350), processing circuitry 320 executes instructions to provide some or all of the functionality described above as being provided by a network node 115, memory 330 stores the instructions executed by processing circuitry 320, and network interface 340 communicates signals to backend network components, such as a gateway, switch, router, Internet, Public Switched Telephone Network (PSTN), core network nodes or radio network controllers, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 320 may include any suitable combination of hardware and software implemented in one or more modules to execute instructions and manipulate data to perform some or all of the described functions of network node 115. In some embodiments, processing circuitry 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 340 is communicatively coupled to processing circuitry 320 and may refer to any suitable device operable to receive input for network node 115, send output from network node 115, perform suitable processing of the input or output or both, communicate to other devices, or any combination of the preceding. Network interface 340 may include appropriate hardware (e.g., port, modem, network interface card, etc.) and software, including protocol conversion and data processing capabilities, to communicate through a network.

Other embodiments of network node 115 may include additional components beyond those shown in FIG. 3 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Disclosed embodiments are applicable for a wireless device 110 in a low or in high activity state. Examples of low activity state are RRC idle state, idle mode etc. Examples of low activity state are RRC CONNECTED state, active mode, active state etc. Wireless device 110 may be configured to operate in DRX or in non-DRX. If configured to operate in DRX, it may still operate according to non-DRX as long as it receives new transmissions from the network node 115.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL) or bidirectional (e.g., RTT, Rx-Tx, etc.). Some examples of radio measurements: timing measurements (e.g., TOA, timing advance, RTT, Reference signal time difference (RSTD), SSTD, Rx-Tx, propagation delay, etc.), angle measurements (e.g., angle of arrival), power-based measurements (e.g., received signal power, RSRP, received signal quality, Reference Signal Received Quality (RSRQ), NRSRP, NRSRQ, Signal to interference and noise ratio (SINR), Signal-to-Noise-Ratio (SNR), interference power, total interference plus noise, Reference Signal Strength Indication (RSSI), noise power, CQI, CSI, PMI, etc.), cell detection or cell identification, beam detection or beam identification, Radio link monitoring (RLM), system information (SI) reading, etc.

Wireless device 110 may operate under either normal coverage or enhanced coverage with respect to its serving cell. The enhanced coverage is also interchangeably called extended coverage. The UE may also operate in a plurality of coverage levels (CE). Example coverage levels may include normal coverage (CE level 0 or CE0), enhanced coverage level 1 (CE1), enhanced coverage level 2 (CE2), enhanced coverage level 3 (CE3), and so on.

The normal and extended coverage operations may typically take place on narrower UE RF bandwidth compared with the system bandwidth aka cell BW, cell transmission BW, DL system BW etc. In some embodiments the UE RF BW can be the same as of the system bandwidth. Examples of narrow RF BWs are 200 KHz, 1.4 MHz etc. Examples of system BW are 200 KHz, 1.4 MHz, 3 MHz, 5 MHz, 10, MHz, 15 MHz, 20 MHz etc. In case of extended/enhanced coverage, wireless device 110 may be capable of operating under lower signal quality level (e.g. SNR, SINR, ratio of average received signal energy per subcarrier to total received power per subcarrier ($\hat{E}s$/Iot)), RSRQ etc) compared to its capabilities when operating in legacy systems. The coverage level enhancement may vary with the operational scenario and may also depend on the UE type. For example, a wireless device 110 which is located in a basement with bad coverage may need larger level of coverage enhancement (e.g. 20 dB) compared to a wireless device 110 which is at a cell border (e.g. −3 dB).

The coverage level of the wireless device 110 may be defined with respect to any cell. In certain embodiments, the coverage level of wireless device 110 may be defined with respect to any one or more of a serving cell, non-serving cell, neighbor cell, or other cell. The coverage level may also be interchangeably called as the coverage enhancement (CE) level. For example the CE level with respect to a cell can be expressed in terms of signal level received at wireless device 110 from that cell. Alternatively, the CE level of wireless device 110 with respect to a cell can be expressed in terms of signal level received at the cell from wireless device 110. As an example received signal level can be expressed in terms of received signal quality and/or received signal strength at wireless device with respect to the cell. More specifically the coverage level may be expressed in terms of:

received signal quality and/or received signal strength at wireless device 110 with respect to a cell; and/or
received signal quality and/or received signal strength at the cell with respect to the wireless device.

Examples of signal quality are signal to noise ratio (SNR), signal to interference and noise ratio (SINR), channel quality indicators (CQI), reference signal received quality (RSRQ), NRSRQ, CRS Ês/Iot, SCH Ês/Iot etc. Examples of signal strength are path loss, path gain, reference signal received power (RSRP), NRSRP, SCH_RP etc. The notation Ês/Iot is defined as ratio of Ês, which is the received energy per RE (power normalized to the subcarrier spacing) during the useful part of the symbol, i.e. excluding the cyclic prefix, at the UE antenna connector, to
Iot which is the received power spectral density of the total noise and interference for a certain RE (power integrated over the RE and normalized to the subcarrier spacing) as measured at the UE antenna connector The CE level is also expressed in terms of two or more discrete levels or values such as, for example, CE level 1, CE level 2, CE level 3, etc. Consider an example of 2 coverage levels defined with respect to signal quality (e.g. SNR) at wireless device 110 comprising of:

Coverage enhancement level 1 (CE1) comprising of SNR≥−6 dB at UE with respect to a cell; and
Coverage enhancement level 2 (CE2) comprising of −15 dB≤SNR<−6 dB at UE with respect to a cell.

In the above example, the CE1 may also be interchangeably called as normal coverage level, baseline coverage level, reference coverage level, legacy coverage level, etc. On the other hand, CE2 may be termed as enhanced coverage or extended coverage level.

In another example, two different coverage levels (e.g. normal coverage and enhanced coverage) may be defined in terms of signal quality levels as follows:

The requirements for normal coverage are applicable for the UE category NB1 with regard to a cell provided that radio conditions of the UE with respect to that cell are defined as follows SCH Ês/Iot≥−6 dB and CRS Ês/Iot≥−6.
The requirements for enhanced coverage are applicable for the UE category NB1 with regard to a cell provided that radio conditions of the UE with respect to that cell are defined as follows SCH Ês/Iot≥−15 dB and CRS Ês/Iot≥−15.

A parameter defining coverage level of wireless device 110 with respect to a cell may also be signalled to wireless device 110 by network node 115. Examples of such parameters are CEModeA and CEModeB signalled to UE category M1. For example:

The requirements for CEMode A apply provided the UE category M1 is configured with CEMode A, SCH Ês/Iot≥−6 dB and CRS Ês/Iot≥−6 dB.
The requirements for CEMode B shall apply provided the UE category M1 is configured with CEMode B, SCH Ês/Iot≥−15 dB and CRS Ês/Iot≥−15 dB.
In the above examples Ês/Iot is the ratio of received power per subcarrier to the total interference including noise per subcarrier.

Figure 4:
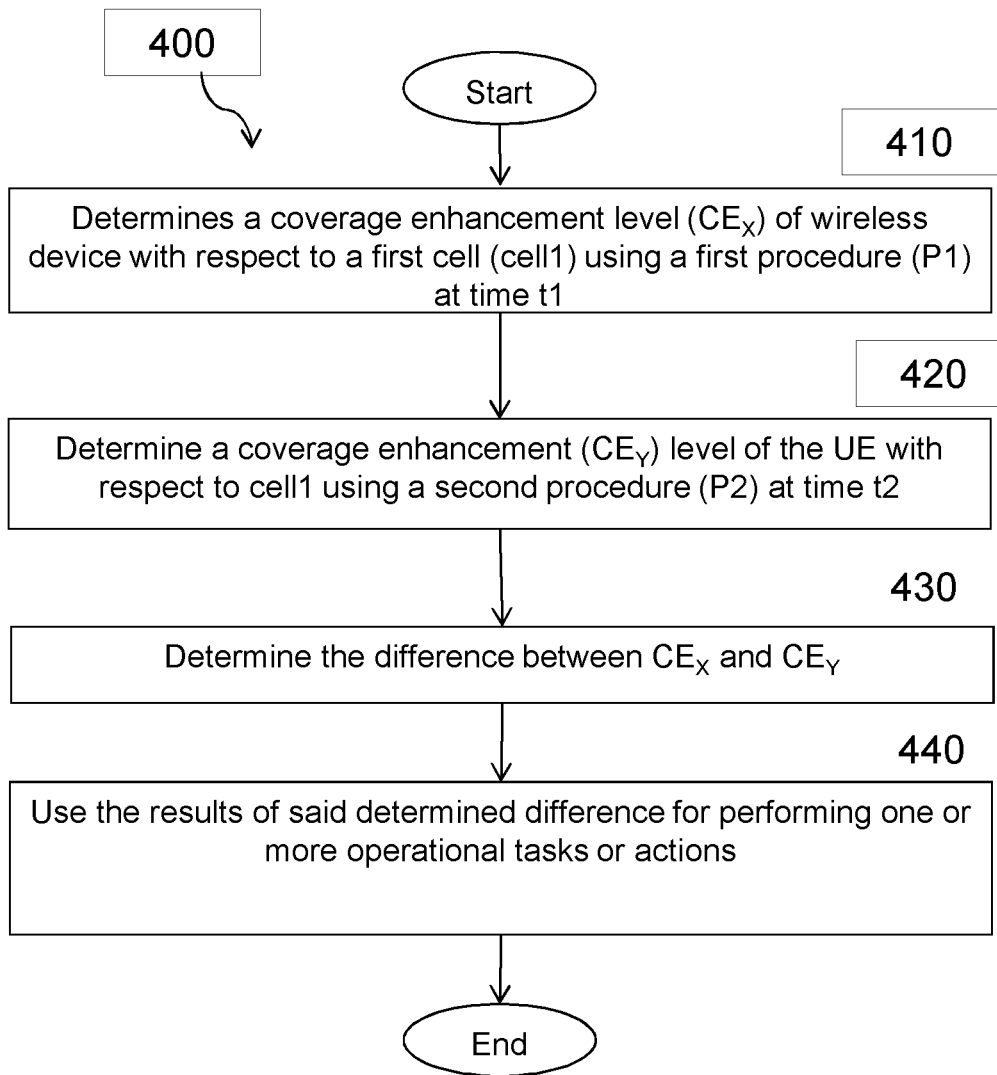
FIG. 4 illustrates an example method by a wireless device, according to certain embodiments.

FIG. 4 another example method by a wireless device, according to certain embodiments. The method may begin at step 410 when wireless device 110 determines a coverage enhancement level ($CE_X$) of wireless device 110 with respect to a first cell (cell1) using a first procedure (P1) at time t1.

In certain embodiments, in this step, wireless device 110 determines a coverage enhancement, CE, level of wireless device 110 with respect to a first cell (cell1) by using a first procedure (P1) at time t1. The CE level herein is called as $CE_X$.

Examples of cell1 are serving cell and non-serving cell. Further examples of serving cell are Primary Cell (PCell), Primary Secondary Cell (PSCell), Secondary Cell (SCell), etc. Examples of non-serving cell are neighbor cell on serving carrier (aka intra-frequency neighbor cell), neighbor cell on non-serving carrier (aka inter-frequency cell, inter-RAT cell etc). Even though the embodiments are mainly described for cell1 but they apply to any number and/or combination of cells (e.g. one or more serving cells and/or one or more neighbor cells).

An example of P1 is the method in which wireless device 110 receives a message or indication from a network node 115, for example, via physical layer and/or higher layers signaling. The message implicitly or explicitly indicates the CE level of wireless device 110 with respect to cell1. This CE level is thus the CE level configuration the network node 115 may be aware of.

An example of explicit message is an indication about the CE level of wireless device 110 with respect to cell1, such as for example, CE level #0, CE level #1, CE level#2 etc. In yet another example the message may comprise of 1-bit of indication e.g. 0 and 1 indicating normal coverage with respect to cell1 and enhanced coverage with respect to cell1, respectively. In another specific example, a MTC UE may be configured to operate in one of the: CEModeA and CEModeB.

An example of implicit message may comprise of one or more configuration parameters which are associated with certain CE level. Examples of such configuration parameters are the number of repetitions to be used by wireless device 110 for transmitting certain UL channel (e.g. PUSCH), a number of repetitions for receiving certain DL channel (e.g. PDSCH), and a type of measurement to be performed by wireless device 110.

At step 420, wireless device 110 determines a coverage enhancement ($CE_Y$) level of the UE with respect to cell1 using a second procedure (P2) at time t2. In this step, wireless device 110 determines a coverage enhancement, CE, level of the wireless device 110 with respect to a first cell (cell1) by using a second procedure (P2) at time t2. The CE level herein is called as $CE_Y$.

In certain embodiments, an example of P2 is the method in which wireless device 110 performs one or more radio measurements on signals related to cell1 and uses at least the results of the performed radio measurement(s) for determining the CE level with respect to cell1. The procedure P2 differs with P1 in that in the former case the wireless device 110 does not receive any indication about the CE level of wireless device 110 from the network node 115. However, the wireless device 110 may be configured by the network node 115 with one or more parameters. These parameters may enable wireless device 110 to determine the CE level based on the radio measurements performed by wireless device 110. Examples of such parameters are signal threshold for comparing the results of the radio measurements, thresholds for determining CE level during random access procedure based on radio measurement (e.g. RSRP).

In one example, t2 may be later than t1. In another example, t2 may be earlier than t1. In yet another example, wireless device 110 may also verify that the difference between t2 and t1 is within a threshold, e.g., t2−t1<=threshold1 and/or t1−t2<=threshold2 and/or abs(t2−t1)<=threshold3; and depending on the verification result decide whether to proceed or not to the next step (e.g., proceed if the time difference is above a threshold and not proceed if the time difference is below the threshold).

The measurement(s) for determining the CE level may be performed by wireless device 110 on DL signals received by wireless device 110 from cell1 and/or on the UL signals transmitted by wireless device 110 in cell1. This is explained with examples below:

1. In one specific example, the UE may estimate DL signal quality of cell1 and compare this with at least one signal quality threshold to determine the CE level of the UE with respect to cell1. Examples of signal quality are SCH Ês/Iot, CRS Ês/Iot, NRS Ês/Iot, RSRQ, NRSRQ, SINR, SNR etc. For example if SCH Ês/Iot≥−6 dB then it is determined that the UE operates in normal coverage (e.g. CE level 1), but if SCH Ês/Iot<−6 dB then it is determined that it operates in enhanced coverage (e.g. CE level 2).
2. In another example, where CE level is determined based on signal quality measurement, if SCH Ês/Iot≥−6 dB then it is determined that the UE operates in normal coverage (e.g. CE level 1), but if SCH Ês/Iot≥−15 dB then it is determined that it operates in enhanced coverage (e.g. CE level 2).
3. In yet another example the CE level is determined based on two or more signal quality measurements. For example if (SCH Ês/Iot≥−6 dB AND CRS Ês/Iot≥−6 dB) then it is determined that the UE operates in normal coverage (e.g. CE level 1), but if (SCH Ês/Iot<−6 dB AND CRS Ês/Iot<−6 dB) then it is determined that it operates in enhanced coverage (e.g. CE level 2).
4. In another specific example, the UE may estimate DL signal strength of cell1 and compare this with at least one signal strength threshold to determine the CE level of the UE with respect to cell1. Examples of signal strength measurements are path loss, RSRP, NRSRP etc. As an example the UE may determine the CE level during the random access procedure for sending RA to cell1. For example if the measured RSRP≥−90 dBm then it is determined that the UE operates in normal coverage (e.g. CE level 1), otherwise if RSRP<−90 dBm then it is determined that the UE operates in enhanced coverage (e.g. CE level 2).

At step 430, wireless device 110 determines the difference between $CE_X$ and $CE_Y$. In certain embodiments, the determining may comprise, for example, determining whether the levels are different (e.g., the levels differ by at least delta, wherein the delta may be >=0), whether the levels are similar (e.g., do not differ by more than a delta), determining of the amount of difference, determining/updating an indication of mismatch between $CE_X$ and $CE_Y$, etc. The difference can be expressed in terms of physical quantity and/or a mismatch identifier (e.g. 0 and 1 mean mismatch and no mismatch respectively).

The difference between $CE_X$ and $CE_Y$ herein may also correspond to a comparison between the values of $CE_X$ and $CE_Y$. In one example the comparison can be a physical difference between the values of $CE_X$ and $CE_Y$, while in another example the comparison can be a ratio between the values of $CE_X$ and $CE_Y$ (e.g. ratio of $CE_X$ to $CE_Y$ or ratio of $CE_Y$ to $CE_X$). The physical different can be an expressed in linear scale or in a log scale e.g. X dB.

In one example, wireless device 110 compares the results of the determined CE levels with respect to cell1 ($CE_X$ and $CE_Y$) determined or estimated in the previous steps (i.e. in Step 1 and Step 2). Specifically, wireless device 110 may determine based on said comparison whether there is any mismatch between the two CE levels ($CE_X$ and $CE_Y$). This is explained with examples below:

1. In one example assume that $CE_X$ and $CE_Y$ correspond to CE1 and CE2 respectively. Since the two CE levels are different therefore the UE assumes that there is mismatch between the CE levels determines based on P1 and P2.
2. In another example assume that $CE_X$ and $CE_Y$ correspond to CE2 and CE1 respectively. Since the two CE levels are also different in this example therefore the UE also assumes in this case that there is mismatch between the CE levels determined based on P1 and P2.
3. In yet another example assume that $CE_X$ and $CE_Y$ correspond to CE1 and CE1 respectively. Since the two CE levels are the same therefore the UE assumes that the CE level with respect to cell1 is consistent and appropriate.

In another example, wireless device 110 may determine the difference between $CE_X$ and $CE_Y$, based on the comparison of radio conditions or measurements used for determining $CE_X$ and $CE_Y$, e.g., the difference between RSRP or RSRQ at time t1 and RSRP and RSRQ at time t2.

The step of comparison (aka difference herein) is further explained with specific example. Wireless device 110 may be configured by the network node 115 with either CE Mode A or with CE Mode B. In certain embodiments, CE Mode A and CE Mode may B correspond to normal coverage and enhanced coverage levels, respectively. This is shown in TABLE 1:

TABLE 1

| Cases | Configured CE Mode | Meaning |
| --- | --- | --- |
| 1 | CE Mode A | UE in normal coverage |
| 2 | CE Mode B | UE in enhanced coverage |

The normal and enhanced coverage levels also correspond to certain received signal levels at wireless device, such as, for example, SNR, SINR, etc. In one particular exemplary embodiment, normal and enhanced coverage levels may correspond to SINR≥−6 dB and SINR≥−15 dB, respectively. Examples of SINR are SCH and CRS Ês/Iot. This is shown in TABLE 2:

TABLE 2

| Cases | Configured CE Mode | Meaning |
|---|---|---|
| 1 | SCH and CRS Ês/Iot ≥ −6 dB | UE in normal coverage |
| 2 | SCH and CRS Ês/Iot ≥ −15 dB | UE in enhanced coverage |

The purpose of the comparison between the configured CE mode and the CE level based on signal level at wireless device 110, is to identify:

Whether the configured CE mode and the CE level based on signal level are the same i.e. whether both correspond to normal coverage levels or correspond to enhanced coverage levels, Whether the configured CE mode and the CE level based on signal level are NOT the same i.e. whether the configured CE mode and the CE level based on signal level correspond to normal coverage level and enhanced coverage level or vice versa.

An example of the outcome of the comparisons for different cases is shown in TABLE 3:

TABLE 3

| Cases | Configured CE Mode (X) | Actual signal quality at UE (Y) | Outcome of comparison between X and Y |
|---|---|---|---|
| 1 | CE Mode A | SCH and CRS Ês/Iot ≥ −6 dB | Normal coverage i.e. consistent |
| 2 | CE Mode B | SCH and CRS Ês/Iot ≥ −15 dB | Enhanced coverage i.e. consistent |
| 3 | CE Mode A | SCH and CRS Ês/Iot ≥ −15 dB | inconsistent |
| 4 | CE Mode B | SCH and CRS Ês/Iot ≥ −6 dB | inconsistent |

At step 440, wireless device 110 uses the results of said determined difference for performing one or more operational tasks or actions. In certain various embodiments, the one or more operational tasks may include one or more of transmitting the results to another node, indicating a mismatch between $CE_X$ and $CE_Y$, adapting one or more requirements, sending random access requests, or other suitable operational tasks. This step may always follow step 430 or may only follow step 430 selectively, for example, if one or more conditions are met. In certain embodiments, some examples of the conditions are:

The difference is above a threshold (the threshold may be >=0)

The mismatch indicator indicates the presence of mismatch abs(t2−t1)<=threshold1 abs(t2−t1)>threshold2

Examples of operational tasks that may be performed based on the determined difference are explained below:

1. Using the results of the comparison for adapting one or more UE requirements based on the results of the mismatch between $CE_X$ and $CE_Y$. The UE requirements are typically pre-defined and/or can be configured by the network node. The UE requirement is also interchangeably called as measurement requirements, accuracy requirements, RRM requirements, mobility requirements, positioning measurement requirements, performance requirements, demodulation requirement, CSI requirements etc. The UE may have to adapt one or more measurement procedures in order to meet one or more pre-defined UE requirements. Examples of UE requirements related to UE measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, Cell Global Identity (CGI) acquisition delay etc. For example if there is a mismatch between CE levels with respect to cell1 ($CE_X$ and $CE_Y$y) then the UE may meet requirements corresponding to one of the CE levels ($CE_X$ and $CE_Y$). This is explained with several examples below:

a. In one example the UE may be configured to meet either requirements corresponding to $CE_X$ and $CE_Y$ in case there is a mismatch between $CE_X$ and $CE_Y$. For example the UE is configured to always meet requirements defined for $CE_X$ in case there is a mismatch between $CE_X$ and $CE_Y$, b. In another example of a rule, which can be pre-defined, the UE may meet requirements corresponding to CE level determined based on one of the procedures in case of the mismatch. For example it may be pre-defined that in case there is a mismatch between $CE_X$ and $CE_Y$ then the UE shall meet requirements corresponding to the CE level determined based on the second method i.e. $CE_Y$, c. In yet another example of a rule, which can be pre-defined or configured by the network node, the UE may meet requirements corresponding to the lowest CE level in case of mismatch. For example if $CE_X$=CE1 and $CE_Y$=CE3 then the UE shall meet requirements corresponding to CE1. In another example if $CE_X$=CE3 and $CE_Y$=CE2 then the UE shall meet requirements corresponding to CE2, d. In yet another example of a rule, which can be pre-defined or configured by the network node, the UE may be required to meet requirements corresponding to certain reference CE level in case of mismatch between $CE_X$ and $CE_Y$. Examples of reference CE ($CE_R$) level are CE level corresponding to normal coverage level (e.g. CEModeA), enhanced coverage level (e.g. CEModeB), certain default coverage level, the coverage level that is associated with least stringent requirements (e.g. less stringent requirement may correspond to longer measurement period compared to more stringent requirement) etc.

e. In yet another example of a rule, which can be pre-defined or configured by the network node, the UE is not required to meet any requirements in case of mismatch between $CE_X$ and $CE_Y$. The rule may further require the UE not to perform certain measurement(s) and/or receive certain signal(s). The rule may further require the UE not to perform any measurement and/or receive signal.

f. In yet another example, a UE may be required to meet a first requirement, provided there is no mismatch between $CE_X$ and $CE_Y$. The UE may additionally be required to meet a second requirement, if there is a mismatch, e.g.:

1—UE meets a first requirement (corresponding to CEMode A) when configured with CEMode A (corresponding to P1) and the following conditions hold: SCH Ês/Iot≥−6 dB and CRS Ês/Iot≥−6 dB (corresponding to P2). UE meets a second requirement (corresponding to CEMode A) when configured with CEMode B (corresponding to P1) and the following conditions hold: SCH Ês/Iot≥−6 dB and CRS Ês/Iot≥−6 dB (corresponding to P2).

2—If the difference is below a threshold, the UE may base its operation (e.g., UL transmission, DL reception, performing a measurement, RLM, handover or cell change, etc.) on $CE_X$, otherwise it may base its operation on $CE_Y$.

3—A specific example of using the comparison shown in TABLE 3 is described below. The UE assigns or allocates set of its resources for performing one or more operations related to RRM. The assigned resources are used for the processing of signals used for doing operations e.g. RRM measurements, RLM etc. Examples of resources are memory/buffer, processor, power etc. These operations are associated with UE requirements which are dependent on the coverage level and are to be met by the UE. For example, if the UE has to meet requirements associated with normal coverage, then the UE has to allocate K1 amount of radio resources. By contrast, if the UE has to meet requirements associated with enhanced coverage, then the UE has to allocate K2 amount of radio resources. According to TABLE 3, in cases 1 and 2, the UE will assign K1 and K2 resources respectively for performing the operations and meet corresponding requirements. However for cases 3 and 4 in table due to inconsistency between X and Y, in order to meet one of the two sets of the requirements, the amount of resources need to be adapted. The adaptation is needed because under inconsistency the UE may still be performing certain tasks (e.g. control channel reception) based on the configured CE Mode. In other words, the UE may be running some basic procedure based on normal coverage while others (e.g. RRM whose requirement is to be selected herein) based on enhanced coverage. That means typically under inconsistency between X and Y, the UE would need more resources compared to the case when the X and Y are consistent. This is further explained as follows. For example as shown in TABLES 4 and 5, in case 3 if the UE is required to meet the requirements based on enhanced coverage the UE is required to have K3 sets of resources i.e. not K2. In another example as shown in tables 4 and 5, in case 4 if the UE is required to meet the requirements based on normal coverage the UE is required to have K4 sets of resources i.e. not K1. In the existing solutions only cases 1 and 2 are defined. However the specification of additional cases 3 and 4 would require the UE implementation to set aside new sets of corresponding resources to be able to select and meet the specified requirements.

TABLE 4

| Cases | Configured CE Mode (X) | Actual signal quality at UE (Y) | Selection of requirements |
|---|---|---|---|
| 1 | CE Mode A | SCH and CRS $\hat{E}s/Iot \geq -6$ dB | Associated with normal coverage |
| 2 | CE Mode B | SCH and CRS $\hat{E}s/Iot \geq -15$ dB | Associated with enhanced coverage |
| 3 | CE Mode A | SCH and CRS $\hat{E}s/Iot \geq -15$ dB | Associated with enhanced coverage |
| 4 | CE Mode B | SCH and CRS $\hat{E}s/Iot \geq -6$ dB | Associated with normal coverage |

TABLE 5

| Cases | Configured CE Mode (X) | Actual signal quality at UE (Y) | Resources to meet selected requirements in table 4 |
|---|---|---|---|
| 1 | CE Mode A | SCH and CRS $\hat{E}s/Iot \geq -6$ dB | K1 |
| 2 | CE Mode B | SCH and CRS $\hat{E}s/Iot \geq -15$ dB | K2 |
| 3 | CE Mode A | SCH and CRS $\hat{E}s/Iot \geq -15$ dB | K3 |
| 4 | CE Mode B | SCH and CRS $\hat{E}s/Iot \geq -6$ dB | K4 |

4—Transmitting the results of the comparison between CE levels with respect to cell1 ($CE_X$ and $CE_Y$) obtained in Step 3 to another node. This type of information enables the UE to explicitly indicate to the other node(s), the mismatch (or difference) detected by the UE between $CE_X$ and $CE_Y$. Examples of other node are a network node, another UE capable of D2D and/or V2X operation etc. Examples of the network node are the serving network node, core network node, positioning node etc. The explicit results can be transmitted periodically and/or on event triggered basis (e.g. when mismatch is detected or when the mismatch is changed, or when the difference in mismatch is above a certain threshold). The UE may also transmit the information autonomously and/or when requested by another node. The results can be transmitted in one or more forms e.g.

a. In one specific example the UE may transmit only an indicator indicating whether or not there is a mismatch between $CE_X$ and $CE_Y$ e.g. 0 and 1 means 'NO mismatch' and 'mismatch' respectively.

b. In another specific example the UE may transmit an indicator only if there is a mismatch between $CE_X$ and $CE_Y$.

c. In yet another specific example the UE may transmit information about the determined values of $CE_X$ and $CE_Y$ e.g. $CE_X$=CE1 and $CE_Y$=CE2.

In certain embodiments, the behavior of wireless device 110 may be adapted based on whether the wireless device 110 is configured for CE Mode A or CE Mode B and the actual signal quality. In particular embodiments, the behavior of wireless device 110 may be adapted according to TABLE 6:

TABLE 6

| Cases | Configured CE Mode | Actual signal quality at UE | UE behavior |
|---|---|---|---|
| 1 | CE Mode A | SCH and CRS $\hat{E}s/Iot \geq -6$ dB | UE shall meet RRM requirements for CE Mode A |
| 2 | CE Mode B | SCH and CRS $\hat{E}s/Iot \geq -15$ dB | UE shall meet RRM requirements for CE Mode B |
| 3 | CE Mode A | SCH and CRS $\hat{E}s/Iot \geq -15$ dB | UE shall meet RRM requirements for CE Mode B |
| 4 | CE Mode B | SCH and CRS $\hat{E}s/Iot \geq -6$ dB | UE shall meet RRM requirements for CE Mode B |

4. In yet another specific example, the UE may transmit any of the information in the previous examples provided that the mismatch is larger than certain threshold e.g. the determined values of $CE_X$ and $CE_Y$ differ by at least 2 CE levels e.g. $CE_X$=CE1 and $CE_Y$=CE3, or $CE_X$=CE4 and $CE_Y$=CE2.

5. Transmitting an implicit message to a network node 115 in case there is a mismatch between $CE_X$ and $CE_Y$. An example of implicit message is a random access message. Another example of implicit message is a pattern of certain type of signal. Examples of pattern of signals are K1 number of consecutive random access transmission, K2 number of UL feedback signal transmission (e.g. K2 consecutive CSI reports), K3 number of certain CSI transmission (e.g. CQI corresponding to CQI index 0) etc. Examples of K1, K2 and K3 are any of 2, 3, 4 etc. Upon receiving such implicit message(s) the network node will determine that the UE has mismatch between $CE_X$ and $CE_Y$. In response the network node may again determine the value of $CE_X$ for that UE and may reconfigure the UE with the determined value of $CE_X$. The implicit results or message can be transmitted periodically and/or on event triggered basis (e.g. when mismatch is detected or when the mismatch is changed). The UE may also transmit the implicit information autonomously and/or when requested by another node.

The embodiments are described for mismatch between $CE_X$ and $CE_Y$ of wireless device 110 with respect to a first cell (cell1), which can be a serving or neighbor cell. But the embodiments are applicable for UE coverage mismatch with respect to any cell and/or with respect to any number of cells. The methods can be independently applied for each cell, such as, for example, mismatch between $CE_X$ and $CE_Y$ of the wireless device 110 with respect to cell1, mismatch between $CE_X$ and $CE_Y$ of the UE with respect to a second cell (cell2) and so on. For example cell1 and cell2 can both be serving cells of the wireless device 110, or both can be neighbor cells of wireless device 110 or cell1 and cell2 can be serving and neighboring cells respectively (or vice versa).

Figure 5:
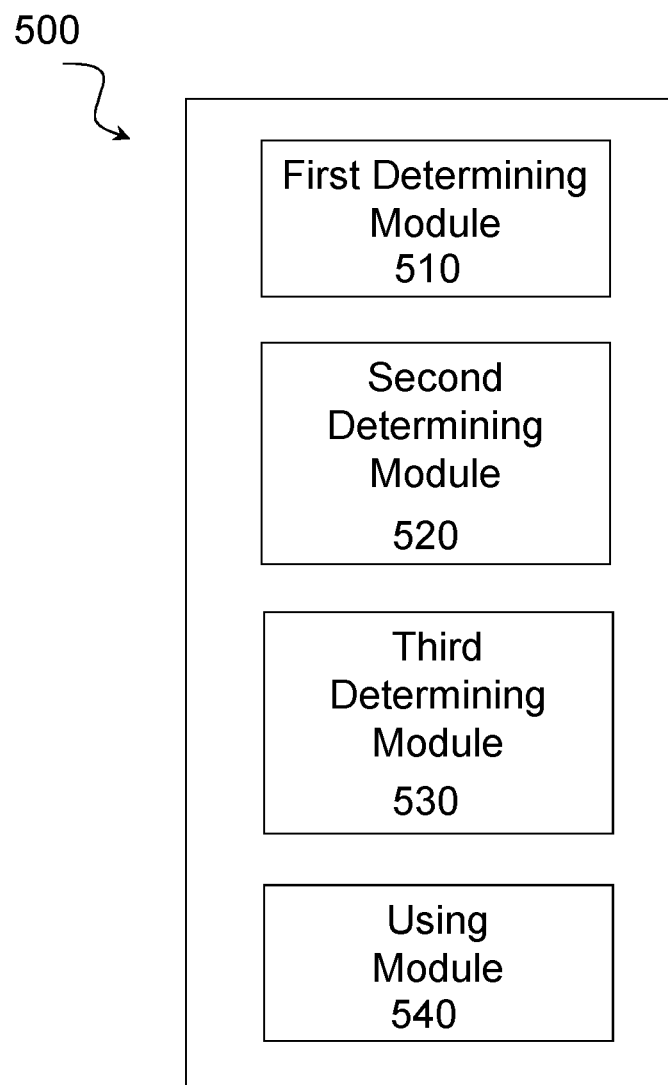
FIG. 5 illustrates an example virtual computing device, according to certain embodiments.

In certain embodiments, the method for identifying CE level mismatch as described above may be performed by a computer networking virtual apparatus. FIG. 5 illustrates an example virtual computing device 500 for identifying CE level mismatch, according to certain embodiments. In certain embodiments, virtual computing device 500 may include modules for performing steps similar to those described above with regard to the method illustrated and described in FIG. 4. For example, virtual computing device 500 may include a first determining module 510, a second determining module 520, a third determining module 530, a using module 540, and any other suitable modules for identifying CE level mismatch. In some embodiments, one or more of the modules may be implemented using processing circuitry 220 of FIG. 2. In certain embodiments, the functions of two or more of the various modules may be combined into a single module.

The first determining module 510 may perform certain of the determining functions of virtual computing device 500. For example, in a particular embodiment, first determining module 510 may determine a coverage enhancement level ($CE_X$) of wireless device 110 with respect to a first cell (cell1) using a first procedure (P1) at time t1.

The second determining module 520 may perform the certain other determining functions of virtual computing device 500. For example, In a particular embodiment, second determining module 520 may determine a coverage enhancement ($CE_Y$) level of the UE with respect to cell1 using a second procedure (P2) at time t2.

The third determining module 530 may perform certain other determining functions of virtual computing device 500. For example, in a particular embodiment, third determining module 530 may determine the difference between $CE_X$ and $CE_Y$.

The using module 540 may perform the using functions of virtual computing device 500. For example, in a particular embodiment, using module 540 may use the results of said determining difference for performing one or more operational tasks or actions.

Other embodiments of virtual computing device 500 may include additional components beyond those shown in FIG. 5 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 6:
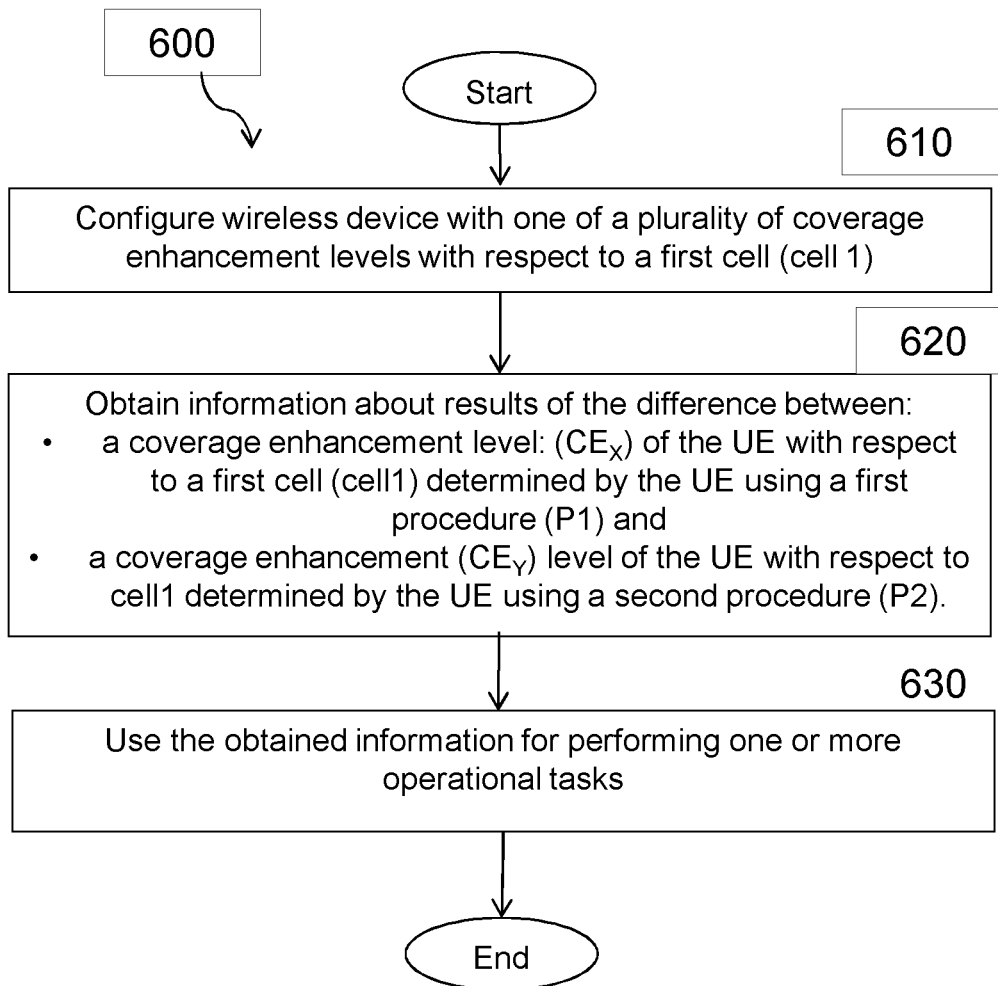
FIG. 6 illustrates an example method by a network node, according to certain embodiments.

FIG. 6 illustrates an example method 600 by a network node 115, according to certain embodiments. The method begins at step 610 when network node 115 configures wireless device 110 with one of a plurality of coverage enhancement levels with respect to a first cell (cell1). In certain embodiments, this step may be optional for the network node 115. Where performed, however, network node 115 configures wireless device 110 with any one of the plurality of coverage enhancement (CE) levels with respect to at least a first cell (cell1). The network node 115 before configuring the wireless device 110 with the CE level may determine said CE level with respect to at least cell1. This method of configuring the wireless device 110 with the CE level with respect to cell1 is based on a first procedure (P1) as described above with respect to FIG. 4.

In particular embodiments, network node 115 may determine the CE level based on one or more of the following means:

During random access (RA) procedure, for example, based on number of repetitions with which the UE has transmitted the RA in cell1, By using the radio measurement results reported by the UE to the network node e.g. based on signal strength and/or signal quality measured by the UE with respect to cell1, By performing radio measurement on signals transmitted by the UE in cell1 e.g. signal strength and/or signal quality measured by the network node on UE's transmitted signal, UE position in cell1 e.g. based on any positioning method such as GNSS, A-GNSS, enhanced cell ID, OTDOA etc., Based on information received from another node which is aware of the UE's CE level with respect to cell1.

At step 620, network node 115 obtains information about results of determining the difference between:

a coverage enhancement level: ($CE_X$) of the UE with respect to a first cell (cell1) determined by the UE using a first procedure (P1) and a coverage enhancement ($CE_Y$) level of the UE with respect to cell1 determined by the UE using a second procedure (P2).

In this step, the network node 115 obtains information about results of determining the difference between a coverage enhancement level ($CE_X$) of the wireless device 110 with respect to cell1 determined by the wireless device 110 based on a first procedure (P1) and a coverage enhancement ($CE_Y$) level of the wireless device 110 with respect to cell1 determined by the wireless device based on a second procedure (P2). Examples of $CE_X$ and $CE_Y$ determined by wireless device 110 based on P1 and P2 respectively are described above (Step 810 and Step 820, respectively, of FIG. 4). Examples of comparison of $CE_X$ and $CE_Y$ are given above (Step 830 of FIG. 4).

The network node obtains information about the results of determining the difference between $CE_X$ and $CE_Y$ based on one or more of the following means:

By receiving information from the UE. The received information may be explicit and/or implicit as described in section 5.2.4 (UE embodiment).

By receiving information from another network node e.g. any network node which is aware of the mismatch between $CE_X$ and $CE_Y$ at the UE.

By autonomously determining the mismatch between $CE_X$ and $CE_Y$. For example the network node determines $CE_X$ as described in section 5.3.1. The network node further determines $CE_y$ based on performance of any downlink signal at the UE. For example this may be determined based on HARQ performance (i.e. ACK/NACK) of DL data transmission to the UE.

At step 630, network node 115 uses the obtained information for performing one or more operational tasks. Specifically, network node 115 uses the information obtained about the mismatch between $CE_X$ and $CE_Y$ for performing one or more operational tasks or actions or procedures. Examples of such tasks are:

Again determining the UE CE level e.g. by requesting the UE to send RA and/or report measurement results, Reconfiguring the UE with a new CE level e.g. newly determined CE level or a reference CE level e.g. CE level corresponding to the normal coverage, Adapting UL PC scheme e.g. using UL PC scheme associated with the CE level which requires higher uplink transmit power, Adapting scheduling of UL and/or DL signals to the UE. For example assigning the UL radio resources with more robust transport format (TF) in case there is a mismatch. Examples of more robust TF are lower order modulation (e.g. 16 QAM instead of 64 or 256 QAM) and/or lower coding rate (e.g. ½ instead of ⅓), Informing other network node (e.g. core network node such as MME, neighboring network node etc) and/or other UEs about the determined mismatch between $CE_X$ and $CE_Y$ for the UE with respect to cell1.

Figure 7:
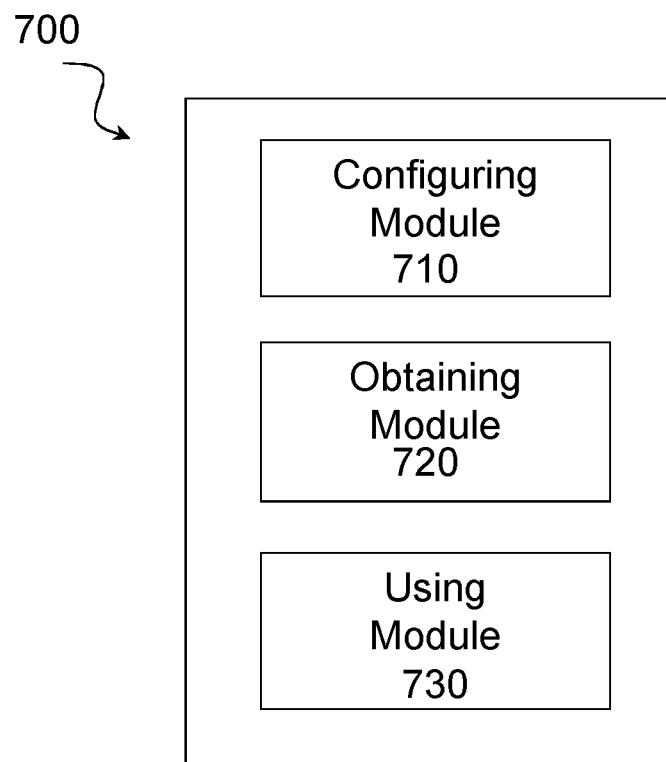
FIG. 7 illustrates an example virtual computing device, according to certain embodiments.

In certain embodiments, the method for identifying CE level mismatch as described above may be performed by a computer networking virtual apparatus. FIG. 7 illustrates an example virtual computing device 700 for identifying CE level mismatch, according to certain embodiments. In certain embodiments, virtual computing device 700 may include modules for performing steps similar to those described above with regard to the method illustrated and described in FIG. 6. For example, virtual computing device 700 may include a configuring module 710, an obtaining module 720, a using module 730, and any other suitable modules for identifying CE level mismatch. In some embodiments, one or more of the modules may be implemented using processing circuitry 320 of FIG. 3. In certain embodiments, the functions of two or more of the various modules may be combined into a single module.

The configuring module 710 may perform the configuring functions of virtual computing device 700. For example, in a particular embodiment, configuring module 710 may configure wireless device with one of plurality of coverage enhancement levels with respect to the first cell (cell1).

The obtaining module 720 may perform the obtaining functions of virtual computing device 700. For example, in a particular embodiment, obtaining module 720 may obtain information about results of the difference between:

a coverage enhancement level: ($CE_X$) of the UE with respect to a first cell (cell1) determined by the UE using a first procedure (P1) and a coverage enhancement ($CE_Y$) level of the UE with respect to cell1 determined by the UE using a second procedure (P2).

The using module 730 may perform the using functions of virtual computing device 700. For example, in a particular embodiment, using module 730 may use the obtained information for performing one or more operational tasks or actions.

Other embodiments of virtual computing device 700 may include additional components beyond those shown in FIG. 7 that may be responsible for providing certain aspects of the network node's functionality, including any of the functionality described above and/or any additional functionality (including any functionality necessary to support the solutions described above). The various different types of network node 115 may include components having the same physical hardware but configured (e.g., via programming) to support different radio access technologies, or may represent partly or entirely different physical components.

Figure 8:
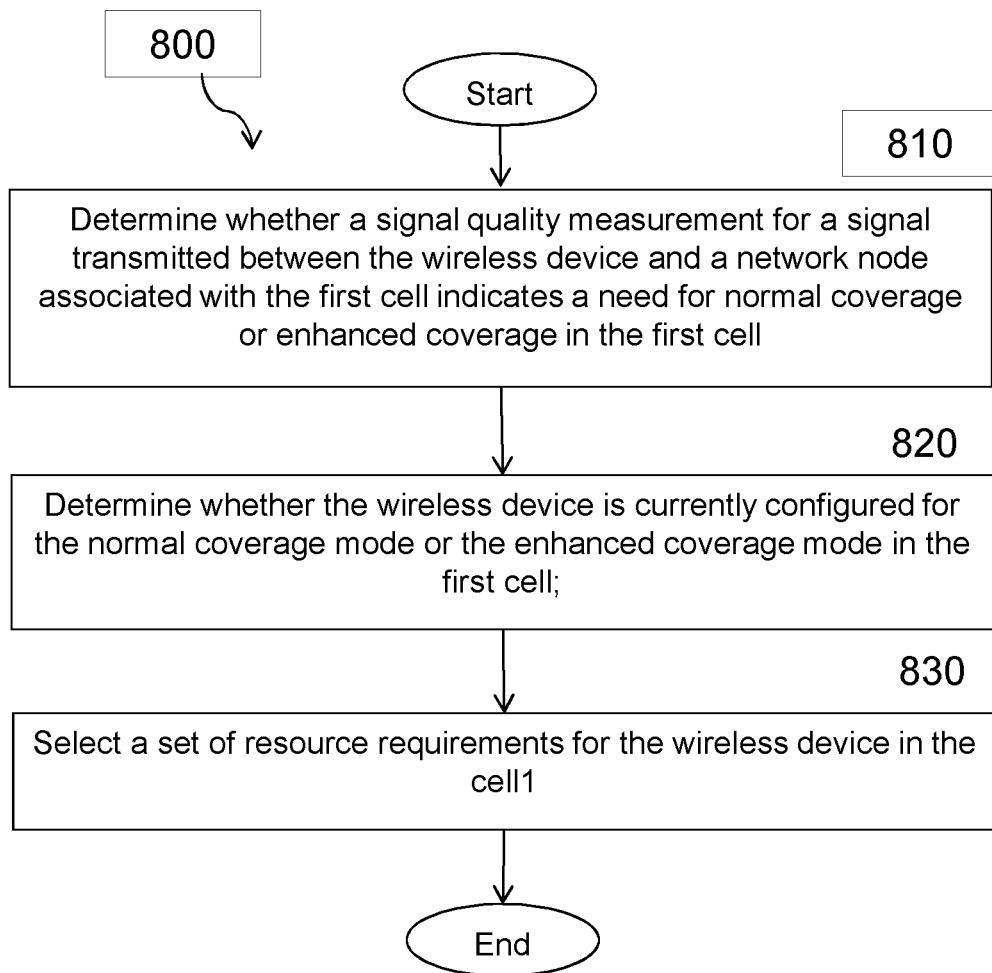
FIG. 8 illustrates another example method by a wireless device, according to certain embodiments.

FIG. 8 illustrates another example method 800 by a wireless device 110, according to certain embodiments. The method begins at step 810 when wireless device 110 determines whether a signal quality measurement for a signal transmitted between the wireless device and a network node associated with the first cell indicates a need for normal coverage or enhanced coverage in the first cell. In a particular embodiment, the signal may be transmitted from the wireless device to the network node 115. In another embodiment, the signal may be received from network node 115 by wireless device 110.

At step 820, wireless device 110 determines whether the wireless device 110 is currently configured for the normal coverage mode or the enhanced coverage mode in the first cell.

At step 830, wireless device 110 selects a set of resource requirements for the wireless device in the first cell. In certain embodiments, the set of resource requirements may be selected such that:

a first set of resource requirements is selected when the signal quality measurement requires normal coverage and the configuration is for normal coverage;

a second set of resource requirements is selected when the signal quality measurement requires enhanced coverage and the configuration is for enhanced coverage;

a third set of resource requirements is selected when the signal quality measurement requires normal coverage and the configuration is for enhanced coverage;

a four set of resource requirements is selected when the signal quality measurement requires enhanced coverage and the configuration is for normal coverage.

Figure 9:
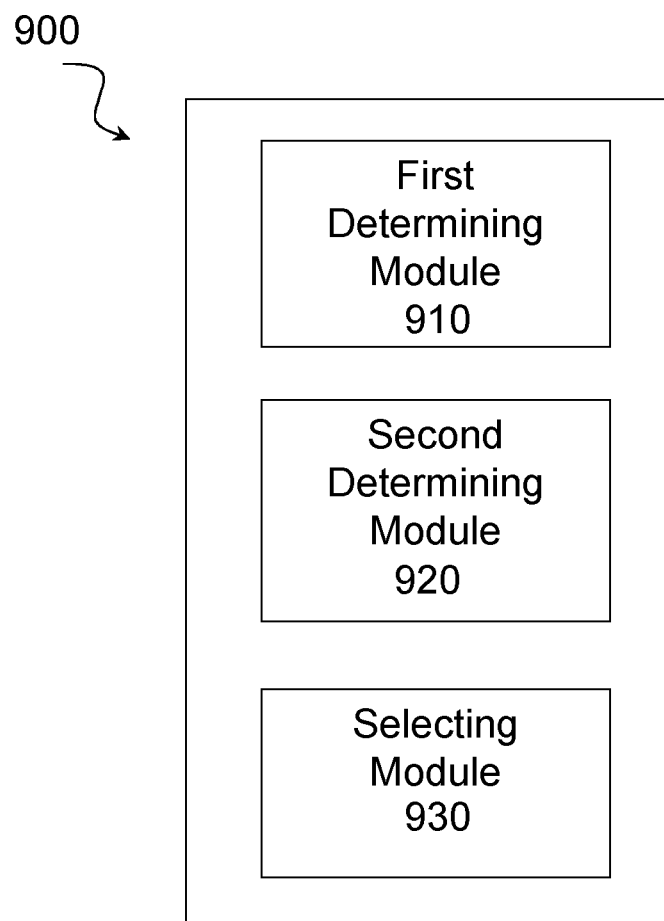
FIG. 9 illustrates another example virtual computing device, according to certain embodiments.

In certain embodiments, the method may further include selecting a set of resources from a plurality of sets of resources to meet wireless device requirements based on the selected set of requirements, such that:

a first set of resources is selected if wireless device is configured for normal coverage and the signal quality measurement is greater than or equal to a first threshold;

a second set of resources is selected if wireless device is configured for enhanced coverage and the signal quality measurement is less than or equal to a second threshold;

a third set of resources is selected if wireless device is configured for normal coverage and the signal quality measurement is less than or equal to the second threshold; and a fourth set of resources is selected if wireless device is configured for enhanced coverage and the signal quality measurement is greater than or equal to the first threshold;

In certain embodiments, the method may further include performing an operational task using the selected set of resources. In various particular embodiments, the operational task may include, for example, performing one of the following:

transmitting the set of resource requirements to a network node adapting one or more requirements;

sending random access;

identifying a mismatch between the configuration of the wireless device and the signal quality measurement;

In certain embodiments, the method for identifying CE level mismatch as described above may be performed by a computer networking virtual apparatus. FIG. 9 illustrates an example virtual computing device 900 for identifying CE level mismatch, according to certain embodiments. In certain embodiments, virtual computing device 900 may include modules for performing steps similar to those described above with regard to the method illustrated and described in FIG. 8. For example, virtual computing device 900 may include a first determining module 910, a second determining module 920, a selecting module 930, and any other suitable modules for identifying CE level mismatch. In some embodiments, one or more of the modules may be implemented using processing circuitry 220 of FIG. 2. In certain embodiments, the functions of two or more of the various modules may be combined into a single module.

The first determining module 910 may perform certain of the determining functions of virtual computing device 900. For example, in a particular embodiment, first determining module 910 may determine whether a signal quality measurement for a signal transmitted between the wireless device and a network node associated with the first cell indicates a need for normal coverage or enhanced coverage in the first cell.

The second determining module 920 may perform certain other determining functions of virtual computing device 900. For example, in a particular embodiment, second determining module 920 may determine whether the wireless device 110 is currently configured for the normal coverage mode or the enhanced coverage mode in the first cell.

The selecting module 930 may perform the selecting functions of virtual computing device 900. For example, in a particular embodiment, selecting module 930 may select a set of resource requirements for the wireless device in the first cell. In certain embodiments, the set of resource requirements may be selected such that:

- a first set of resource requirements is selected when the signal quality measurement requires normal coverage and the configuration is for normal coverage;
- a second set of resource requirements is selected when the signal quality measurement requires enhanced coverage and the configuration is for enhanced coverage;
- a third set of resource requirements is selected when the signal quality measurement requires normal coverage and the configuration is for enhanced coverage;
- a four set of resource requirements is selected when the signal quality measurement requires enhanced coverage and the configuration is for normal coverage.

Other embodiments of virtual computing device 900 may include additional components beyond those shown in FIG. 9 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 10:
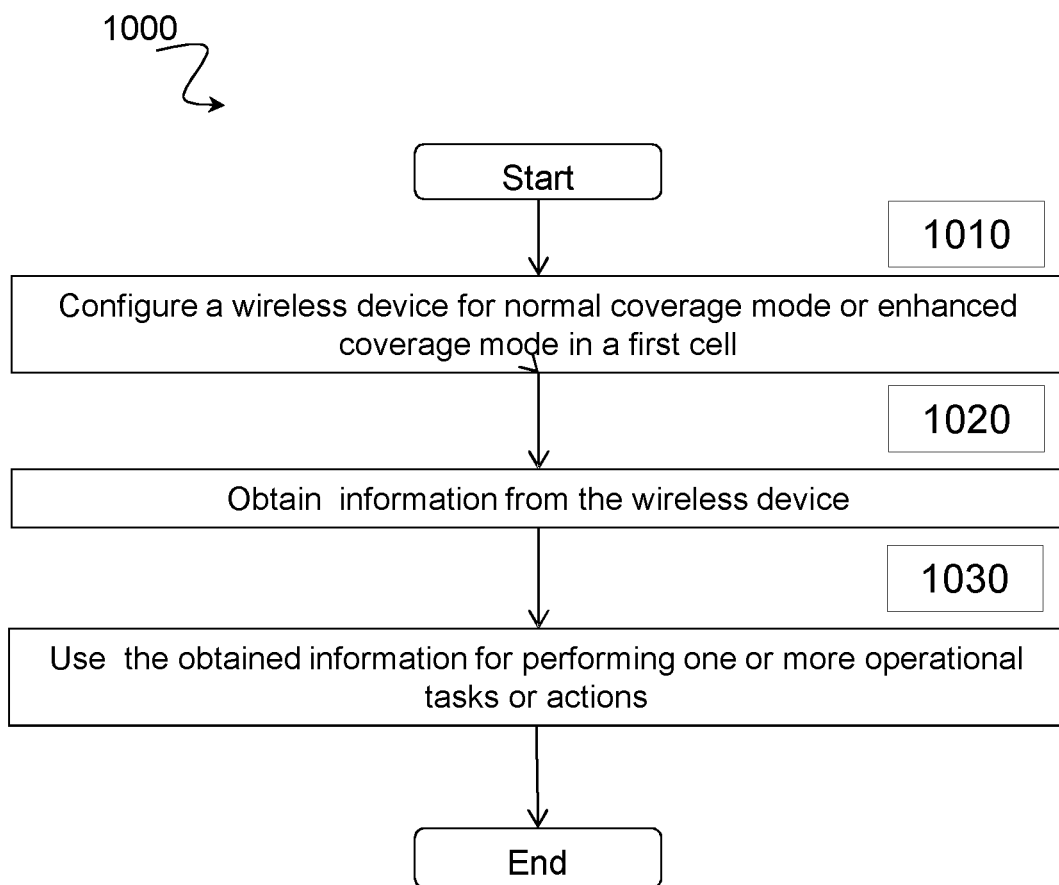
FIG. 10 illustrates another example method by a network node, according to certain embodiments.

FIG. 10 illustrates an example method 1000 by a network node 115, according to certain embodiments. The method may optionally begin at step 1010 when network node 115 configures a wireless device for normal coverage mode or enhanced coverage mode in a first cell.

Figure 11:
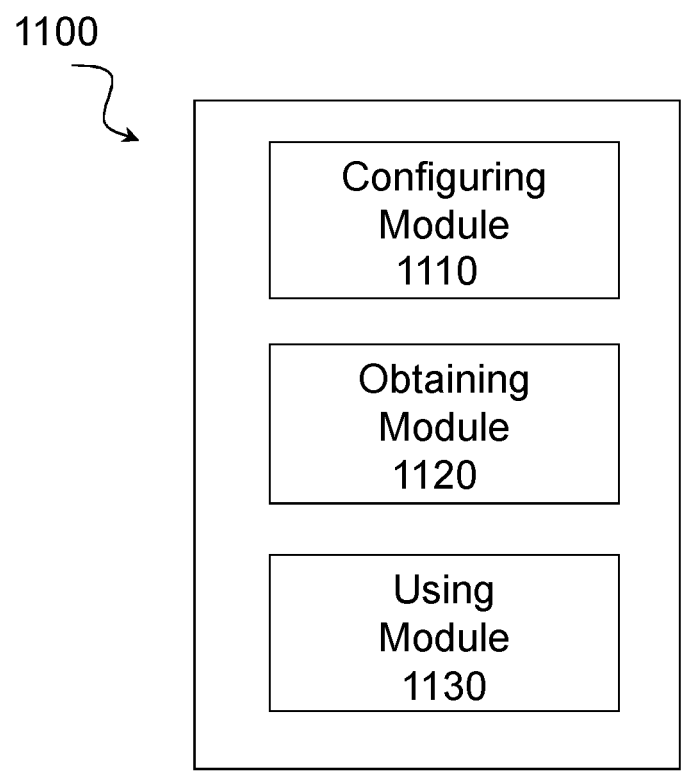
FIG. 11 illustrates another example virtual computing device, according to certain embodiments.

At step 1020, network node 115 obtains information from the wireless device 110. In certain embodiments, the obtained information may indicate one of the following:
the signal quality measurement requires normal coverage and the wireless device is configured for normal coverage;
the signal quality measurement requires enhanced coverage and the wireless device is configured for enhanced coverage;
the signal quality measurement requires normal coverage and the wireless device is configured for enhanced coverage;
the signal quality measurement requires enhanced coverage and the wireless device is configured for normal coverage;

At step 1030, network node 115 uses the obtained information for performing one or more operational tasks or actions, which may include any of the actions described herein or any other suitable action. In certain embodiments, the one or more operational tasks or actions may include:
reconfiguring the UE with CE level;
adapting scheduling in UL and/or DL;
adapting measurement configuration;

In certain embodiments, the method for identifying CE level mismatch as described above may be performed by a computer networking virtual apparatus. FIG. 11 illustrates an example virtual computing device 1100 for identifying CE level mismatch, according to certain embodiments. In certain embodiments, virtual computing device 1100 may include modules for performing steps similar to those described above with regard to the method illustrated and described in FIG. 10. For example, virtual computing device 1100 may include a configuring module 1110, an obtaining module 1120, a using module 1130, and any other suitable modules for identifying CE level mismatch. In some embodiments, one or more of the modules may be implemented using one or more processors 320 of FIG. 3. In certain embodiments, the functions of two or more of the various modules may be combined into a single module.

The configuring module 1110 may perform the configuring functions of virtual computing device 1100. For example, In a particular embodiment, configuring module 1110 may configure a wireless device 110 for normal coverage mode or enhanced coverage mode in a first cell.

The obtaining module 1120 may perform the obtaining functions of virtual computing device 1100. For example, in a particular embodiment, obtaining module 1120 may obtain information from the wireless device 110. In certain embodiments, the obtained information may indicate one of the following:
the signal quality measurement requires normal coverage and the wireless device is configured for normal coverage;
the signal quality measurement requires enhanced coverage and the wireless device is configured for enhanced coverage;
the signal quality measurement requires normal coverage and the wireless device is configured for enhanced coverage;
the signal quality measurement requires enhanced coverage and the wireless device is configured for normal coverage;

The using module 1130 may perform the using functions of virtual computing device 1100. For example, in a particular embodiment, using module 1130 may use the obtained information for performing one or more operational tasks or actions. In certain embodiments, the one or more operational tasks or actions may include:
reconfiguring the UE with CE level;
adapting scheduling in UL and/or DL;
adapting measurement configuration;

Other embodiments of virtual computing device 1100 may include additional components beyond those shown in FIG. 11 that may be responsible for providing certain aspects of the network node's functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 12:
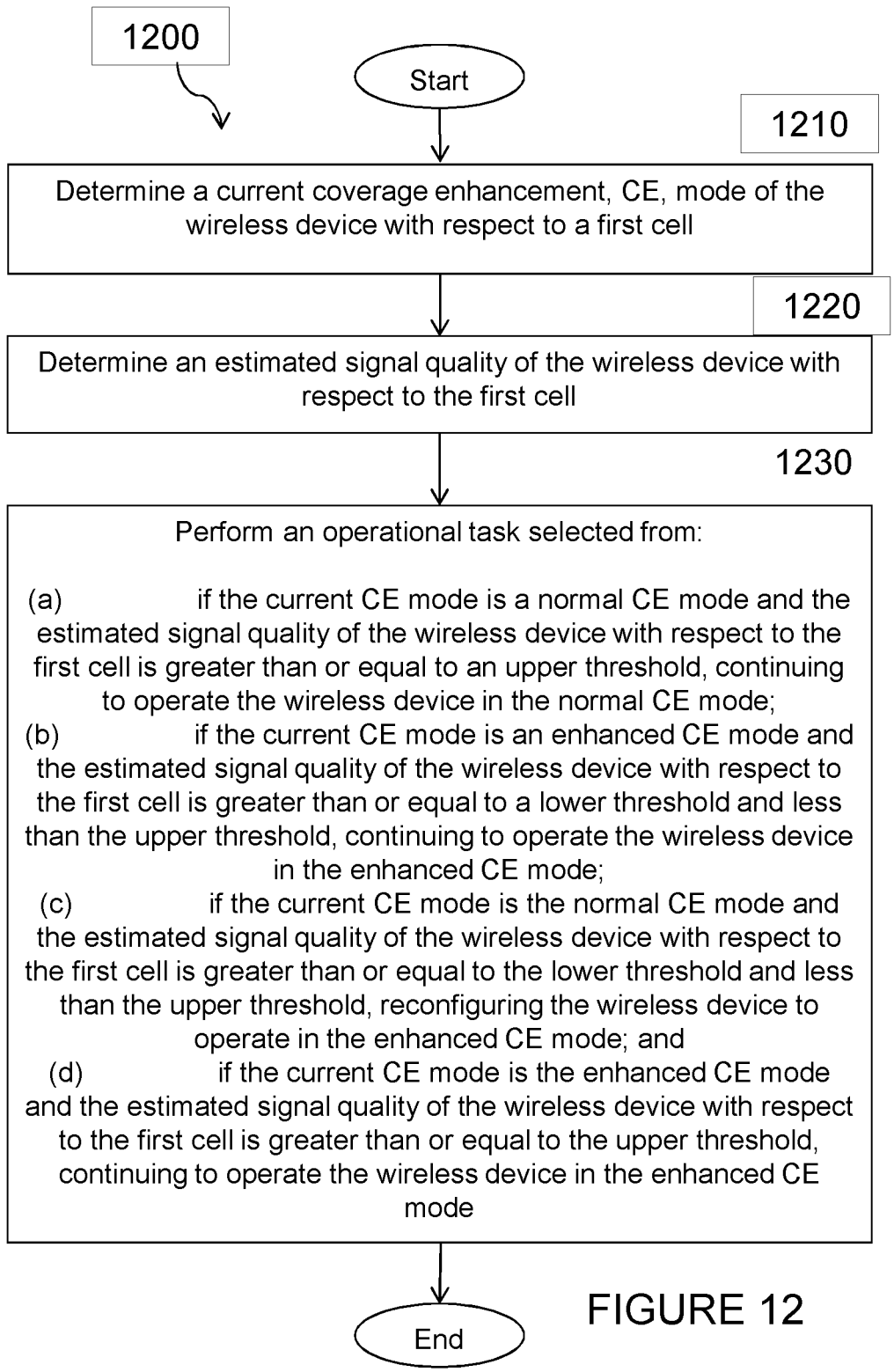
FIG. 12 illustrates another example method by a wireless device, according to certain embodiments.

FIG. 12 illustrates another example method for identifying CE level mismatch by a wireless device 110, according to certain embodiments. The method begins at step 1210 when wireless device 110 determines a current CE mode of the wireless device 110 with respect to a first cell. As used herein, the term current CE mode may refer to the CE mode for which the wireless device 110 is currently configured with respect to the first cell. The current CE mode may be configured via an indication by RRC by the network node 115 and may include a normal CE Mode, which may also be referred to as CEModeA, or an enhanced CE mode, which may also be referred to as CEModeB. More particularly, the current CE mode may be associated with a number of repetitions to be used in DL or UL. According to a particular embodiment, a wireless device 110 configured for normal CE mode may be required to use fewer repetitions than if wireless device 110 is configured for enhanced CE mode.

The first cell may be a serving cell or a non-serving cell. Likewise, the first cell may include any one of a Primary Cell (PCell), Primary Secondary Cell (PSCell), Secondary Cell (SCell), etc. Examples of non-serving cell are neighbor cell on serving carrier (aka intra-frequency neighbor cell), neighbor cell on non-serving carrier (aka inter-frequency cell, inter-RAT cell etc). Even though the described embodiments are mainly described for a first cell but they apply to any number and/or combination of cells (e.g. one or more serving cells and/or one or more neighbor cells). Thus, the current CE mode may apply to any one or combination of the described cells.

At step 1220, wireless device 110 determines an estimated signal quality of the wireless device with respect to the first cell. The determination may be performed since the actual coverage of wireless device 110 with respect to the first cell may have changed since wireless device was configured with the current CE mode. As such, the current CE mode may have become insufficient where channel conditions have deteriorated or redundant where channel conditions have improved. Thus, wireless device 110 may use any one or combination of the techniques discussed herein to determine an estimated signal quality currently experienced by wireless device 110.

In a particular embodiment, wireless device 110 may perform one or more measurements on a signal associated with the first cell and determine the estimated signal quality based on the one or more measurements. According to various particular embodiments, the one or more measurements may include any one or combination of:
a signal quality measurement of a Synchronization Channel (SCH);
a signal quality measurement of a Cell-Specific Reference Signal (CRS);
a signal quality measurement of a Narrowband Reference Signal (NRS);
a Received Signal Received Quality (RSRQ) measurement;
a Narrowband RSRQ (NRSRQ) measurement;
a Received Signal Received Power (RSRP) measurement;
a Narrowband RSRP (NRSRP) measurement;
a path loss;
a path gain;
a Signal-to-Noise-Ratio (SNR) measurement; and
a Signal-Interference-to-Noise Ratio (SINR) measurement.
In a particular embodiment, the measurement time for performing the one or more measurements may be greater when the current CE mode of the wireless device 110 is the enhanced CE mode when the wireless device is configured for normal CE mode. Similarly, a signal quality required for the enhanced CE mode may be lower than a signal quality of the normal CE mode.

At step 1230, wireless device 110 performs an operational task. According to certain embodiments, the operational task is selected from:
a. if the current CE mode is a normal CE mode and the estimated signal quality of the wireless device with respect to the first cell is greater than or equal to an upper threshold, continuing to operate the wireless device in the normal CE mode;
b. if the current CE mode is an enhanced CE mode and the estimated signal quality of the wireless device with respect to the first cell is greater than or equal to a lower threshold and less than the upper threshold, continuing to operate the wireless device in the enhanced CE mode;
c. if the current CE mode is the normal CE mode and the estimated signal quality of the wireless device with respect to the first cell is greater than or equal to the lower threshold and less than the upper threshold, reconfiguring the wireless device to operate in the enhanced CE mode; and
d. if the current CE mode is the enhanced CE mode and the estimated signal quality of the wireless device with respect to the first cell is greater than or equal to the upper threshold, continuing to operate the wireless device in the enhanced CE mode.

Thus, according to certain embodiments, wireless device 110 may be configured to perform one or more of operational steps (a)-(d). In a particular embodiment, wireless device 110 may be configured to perform all of operational steps (a)-(d).

In a particular embodiment, wireless device 110 may perform an additional operational task. For example, the wireless device 110 may perform a comparison of the current CE mode to an estimated CE mode and transmit a result of the comparison to a network node. As used herein the term estimated CE mode refers to the CE mode, either an enhanced CE mode or a normal CE mode, appropriate for the estimated signal quality of the wireless device. In a particular embodiment, for example, wireless device may measure the quality of the channel between the wireless device and the network node to determine the estimated signal quality of the channel. Wireless device 110 may then determine the estimated CE mode that is appropriate for the estimated signal quality.

In a particular embodiment, wireless device 110 may identify a mismatch between the current CE mode and an estimated CE mode appropriate for the estimated signal quality of the wireless device and transmitting an indication of the mismatch to a network node. For example, a mismatch may be identified when the wireless device 110 is currently configured for normal CE mode but the estimated signal quality and the estimated CE mode indicate that the wireless device 110 should be operating in enhanced CE mode. Likewise, a mismatch may be identified when wireless device 110 is currently configured for enhanced CE mode but the estimated signal quality and the estimated CE mode indicate that the wireless device 110 could be more efficiently operated in normal CE mode.

As still another example, wireless device 110 may adapt one or more requirements and/or send random access. As described above, the one or more requirements may include measurement requirements, accuracy requirements, RRM requirements, mobility requirements, positioning measurement requirements, performance requirements, demodulation requirement, CSI requirements etc. Examples of wireless device requirements related to wireless device measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, Cell Global Identity (CGI) acquisition delay etc.

In a particular embodiment, wireless device 110 may also select a set of resources based on the operational task performed. For example, if wireless device performs step (a) at 1230, wireless device 110 may select a first set of resources to meet normal CE mode requirements. Conversely, if wireless device 110 performs steps (b) at 1230, wireless device 110 may select a second set of resources to meet enhanced mode requirements. If wireless device 110 performs step (c) at 1230, wireless device 110 may select a third set of resources to meet enhanced mode requirements, and if wireless device 110 performs step (d) at 1230, wireless device 110 may select a fourth set of resources to meet enhanced mode requirements. According to certain embodiments, each of the first set of resources, the second set of resources, the third set of resources, and the fourth set of resources are distinct. According to certain other embodiments, at least two of the first set of resources, the second set of resources, the third set of resources, and the fourth set of resources may be identical. In various embodiments, the set of resources for enhanced CE mode may be greater than the set of requirements required for normal CE mode.

In a particular embodiment, wireless device 110 may perform an additional operational task. For example, the wireless device 110 may perform a comparison of the current CE mode to an estimated CE mode appropriate for the estimated signal quality of the wireless device and transmitting a result of the comparison to a network node. As another example, wireless device 110 may identify a mismatch between the current CE mode and an estimated CE mode appropriate for the estimated signal quality of the wireless device and transmitting an indication of the mismatch to a network node. As still another example, wireless device 110 may adapt one or more requirements. As yet another example, wireless device 110 may send random access.

Figure 13:
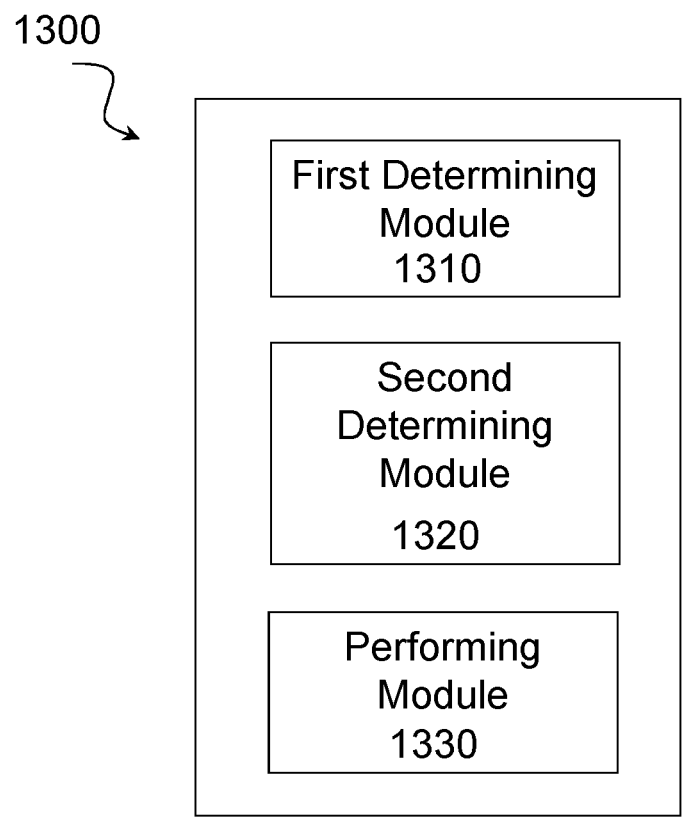
FIG. 13 illustrates another example virtual computing device, according to certain embodiments.

In certain embodiments, the method as described with regard to FIG. 12 may be performed by a computer networking virtual apparatus. FIG. 13 illustrates an example virtual computing device 1300 for identifying CE level mismatch, according to certain embodiments. In certain embodiments, virtual computing device 1300 may include modules for performing steps similar to those described above with regard to the method illustrated and described in FIG. 12. For example, virtual computing device 1300 may include a first determining module 1310, a second determining module 1320, a performing module 1330, and any other suitable modules for identifying CE level mismatch. In some embodiments, one or more of the modules may be implemented using processing circuitry 220 of FIG. 2. In certain embodiments, the functions of two or more of the various modules may be combined into a single module.

The first determining module 1310 may perform certain of the determining functions of virtual computing device 1300. For example, in a particular embodiment, first determining module 1310 may determine a current CE mode of the wireless device 110 with respect to a first cell.

The second determining module 1320 may perform certain other determining functions of virtual computing device 1300. For example, in a particular embodiment, second determining module 1320 may determine an estimated signal quality of the wireless device with respect to the first cell.

The performing module 1330 may perform the performing functions of virtual computing device 1300. For example, in a particular embodiment, performing module 1330 may perform an operational task. According to certain embodiments, the operational task is selected from:
e. if the current CE mode is a normal CE mode and the estimated signal quality of the wireless device with respect to the first cell is greater than or equal to an upper threshold, continuing to operate the wireless device in the normal CE mode;
f. if the current CE mode is an enhanced CE mode and the estimated signal quality of the wireless device with respect to the first cell is greater than or equal to a lower threshold and less than the upper threshold, continuing to operate the wireless device in the enhanced CE mode;
g. if the current CE mode is the normal CE mode and the estimated signal quality of the wireless device with respect to the first cell is greater than or equal to the lower threshold and less than the upper threshold, reconfiguring the wireless device to operate in the enhanced CE mode; and
h. if the current CE mode is the enhanced CE mode and the estimated signal quality of the wireless device with respect to the first cell is greater than or equal to the upper threshold, continuing to operate the wireless device in the enhanced CE mode.

Other embodiments of virtual computing device 1300 may include additional components beyond those shown in FIG. 13 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 14:
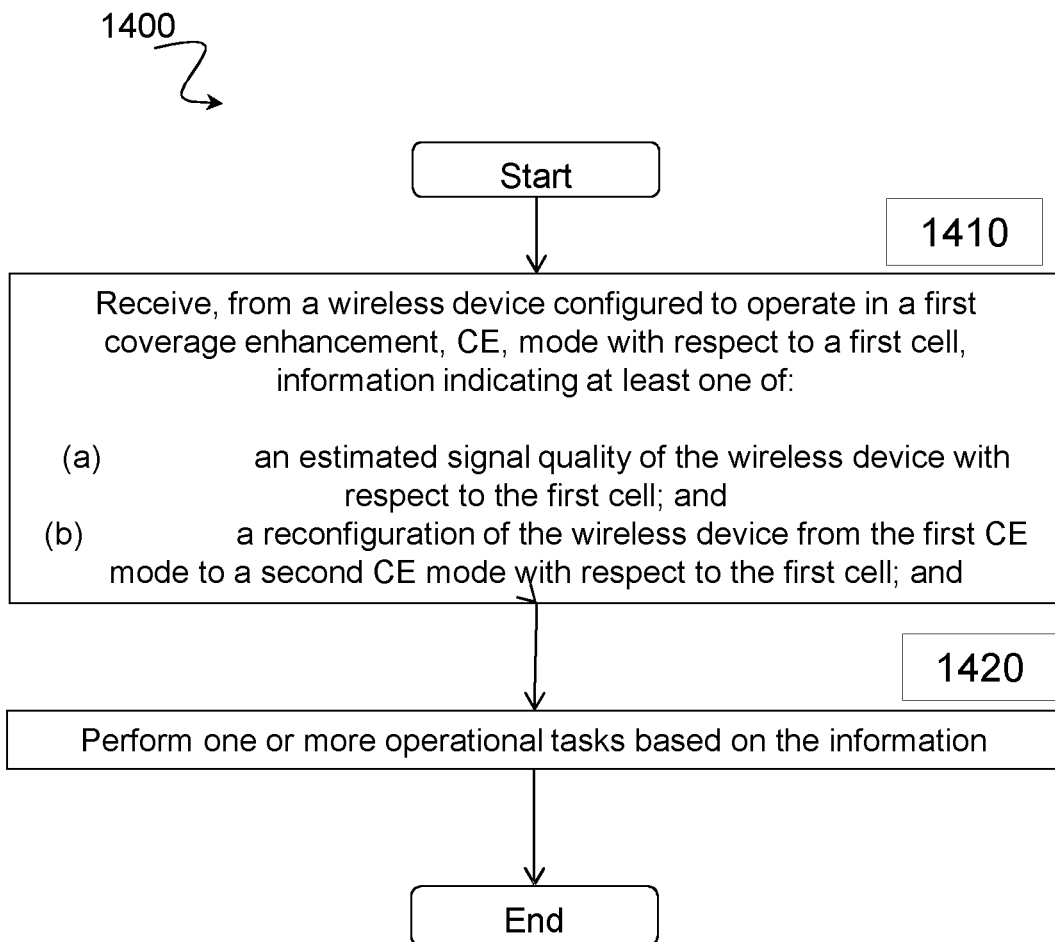
FIG. 14 illustrates another example method by a network node, according to certain embodiments.

FIG. 14 illustrates another example method by a network node 115, according to certain embodiments. The method begins at step 1410 when network node 115 receives, from a wireless device 110 configured to operate in a first coverage enhancement, CE, mode with respect to a first cell. The information may indicate at least one of:
(a) an estimated signal quality of the wireless device with respect to the first cell; and
(b) a reconfiguration of the wireless device from the first CE mode to a second CE mode with respect to the first cell. Network node 115 then performs one or more operational tasks based on the information at step 1420.

As used herein, the term first CE mode may refer to the CE mode for which the wireless device 110 is currently configured with respect to the first cell. The current CE mode may be previously configured via an indication by RRC by the network node 115 and may include a normal CE Mode, which may also be referred to as CEModeA, or an enhanced CE mode, which may also be referred to as CEModeB. More particularly, the first CE mode may be associated with a number of repetitions to be used in DL or UL. According to a particular embodiment, a wireless device 110 that is configured for normal CE mode may be required to use fewer repetitions than a wireless device 110 that is configured for enhanced CE mode.

The first cell may be a serving cell or a non-serving cell. Likewise, the first cell may include any one of a Primary Cell (PCell), Primary Secondary Cell (PSCell), Secondary Cell (SCell), etc. Examples of non-serving cell are neighbor cell on serving carrier (aka intra-frequency neighbor cell), neighbor cell on non-serving carrier (aka inter-frequency cell, inter-RAT cell etc). Even though the described embodiments are mainly described for a first cell but they apply to any number and/or combination of cells (e.g. one or more serving cells and/or one or more neighbor cells). Thus, the current CE mode may apply to any one or combination of the described cells.

However, as described above, the actual coverage of wireless device 110 with respect to the first cell may have changed since wireless device was configured with the first CE mode. As such, the first CE mode may have become insufficient where channel conditions have deteriorated or redundant where channel conditions have improved. Thus, the information received at step 1410 may indicate or may be used to determine that the signal quality of the wireless device has changed or that wireless device 110 has been reconfigured from the first CE mode to a second CE mode. According to a particular embodiment, where the information obtained in step 1410 indicates the estimated signal quality of the wireless device while operating in the first CE mode, the operational task of step 1420 may include determining a mismatch between the first CE mode and a coverage level required for the estimated signal quality.

In another embodiment, where the information obtained in step 1410 indicates the estimated signal quality of the wireless device while operating in the first CE mode, the operational task may include determining whether the estimated signal quality requires a coverage level associated with the first CE mode or the second CE mode. For example, if the first CE mode is a normal CE mode and the estimated signal quality of the wireless device with respect to the first cell is greater than or equal to an upper threshold, network node 115 may continue to operate wireless device 110 in the normal CE mode and may, in a particular embodiment, select a first set of resources to meet normal CE mode requirements. However, if the first CE mode is an enhanced CE mode and the estimated signal quality of the wireless device with respect to the first cell is greater than or equal to a lower threshold and less than the upper threshold, network node 115 may continue to operate wireless device 110 in the enhanced CE mode and may, in a particular embodiment, select a second set of resources to meet enhanced mode requirements. In still another embodiment, if the first CE mode is the normal CE mode and the estimated signal quality of the wireless device with respect to the first cell is greater than or equal to the lower threshold and less than the upper threshold, network node 115 may reconfigure wireless device 110 to operate in the second CE mode, which may include the enhanced CE mode, and select a third set of resources to meet enhanced mode requirements. In yet another embodiment, if the first CE mode is the enhanced CE mode and the estimated signal quality of the wireless device with respect to the first cell is greater than or equal to the upper threshold, network node 115 may continue to operate wireless device 110 in the enhanced CE mode and, in a particular embodiment, select a fourth set of resources to meet enhanced mode requirements.

Again, the term requirements may refer to any one or more of measurement requirements, accuracy requirements, RRM requirements, mobility requirements, positioning measurement requirements, performance requirements, demodulation requirement, CSI requirements etc. Examples of wireless device requirements related to wireless device measurements are measurement time, measurement reporting time or delay, measurement accuracy (e.g. RSRP/RSRQ accuracy), number of cells to be measured over the measurement time etc. Examples of measurement time are L1 measurement period, cell identification time or cell search delay, Cell Global Identity (CGI) acquisition delay etc.

According to certain embodiments, each of the first set of resources, the second set of resources, the third set of resources, and the fourth set of resources may be distinct. In another embodiment, at least two of the first set of resources, the second set of resources, the third set of resources, and the fourth set of resources may be identical. According to certain embodiments, the set of resources for enhanced CE mode may be greater than the set of requirements required for normal CE mode. Additionally or alternatively, a signal quality required for the enhanced CE mode may be lower than a signal quality of the normal CE mode.

According to still other embodiments, the one or more operational tasks may include transmitting, to wireless device 110, an indication to operate the wireless device 110 according to the second CE mode with respect to the first cell. Additionally or alternatively, the one or more operational tasks may include adapting scheduling in uplink and/or downlink and/or adapting a measurement configuration of the wireless device.

According to certain embodiments, prior to obtaining the information at step 1410, network node 115 may transmit, to the wireless device 110, an indication to operate the wireless device 110 according to the first CE mode.

Figure 15:
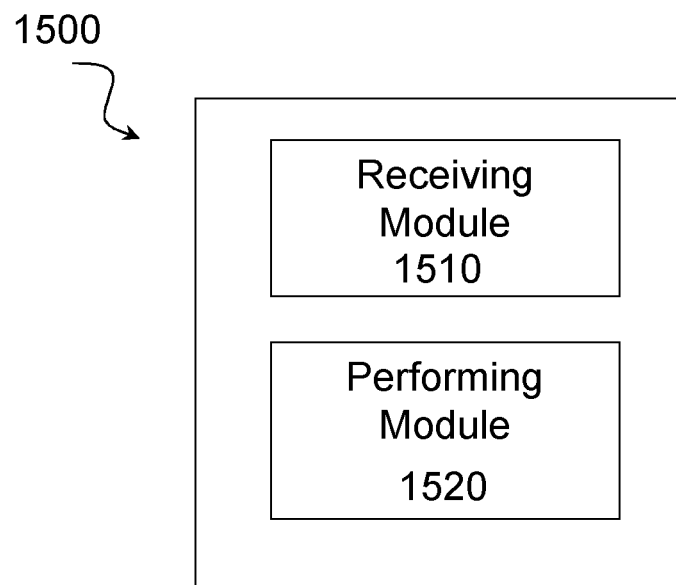
FIG. 15 illustrates another example virtual computing device, according to certain embodiments.

In certain embodiments, the method as described with regard to FIG. 14 may be performed by a computer networking virtual apparatus. FIG. 15 illustrates an example virtual computing device 1500 for identifying CE level mismatch, according to certain embodiments. In certain embodiments, virtual computing device 1500 may include modules for performing steps similar to those described above with regard to the method illustrated and described in FIG. 14. For example, virtual computing device 1500 may include a receiving module 1510, a performing module 1520, and any other suitable modules for identifying CE level mismatch. In some embodiments, one or more of the modules may be implemented using processing circuitry 320 of FIG. 3. In certain embodiments, the functions of two or more of the various modules may be combined into a single module.

The receiving module 1510 may perform certain of the receiving functions of virtual computing device 1500. For example, in a particular embodiment, receiving module 1510 may receive, from wireless device 110 configured to operate in a first CE mode with respect to a first cell, information indicating at least one of:
  (a) an estimated signal quality of the wireless device with respect to the first cell; and
  (b) a reconfiguration of the wireless device from the first CE mode to a second CE mode with respect to the first cell.

The performing module 1520 may perform certain of the performing functions of virtual computing device 1500. For example, in a particular embodiment, performing module 1520 may perform one or more operational tasks based on the information.

Other embodiments of virtual computing device 1500 may include additional components beyond those shown in FIG. 15 that may be responsible for providing certain aspects of the network node's 115 functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

Figure 16:
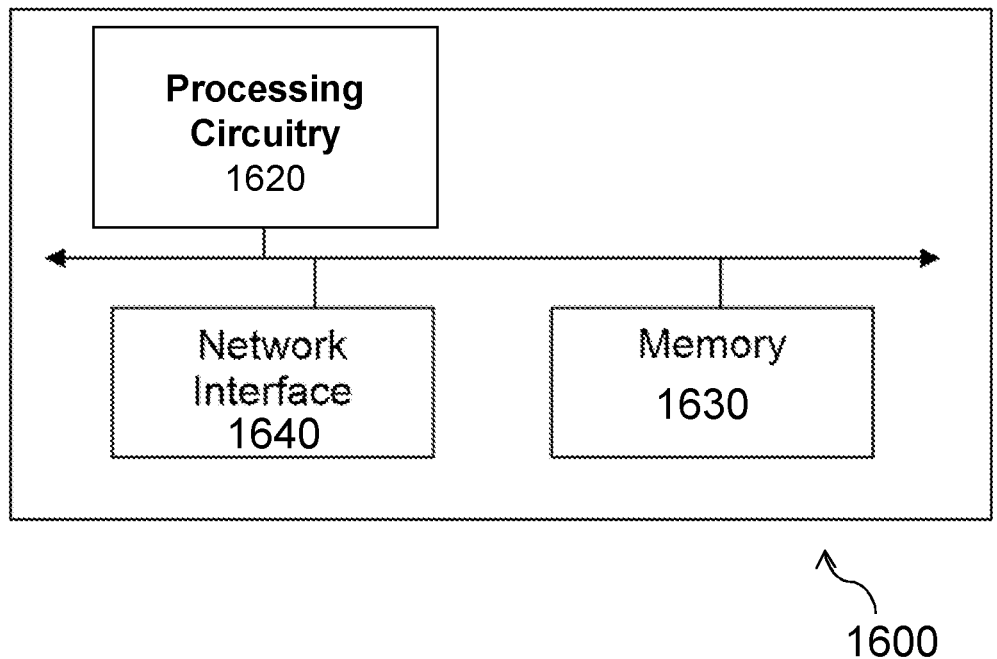
FIG. 16 illustrates an exemplary radio network controller or core network node, according to certain embodiments.

FIG. 16 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1600 includes processing circuitry 1620, memory 1630, and network interface 1640. In some embodiments, processing circuitry 1620 executes instructions to provide some or all of the functionality described above as being provided by the network node, memory 1630 stores the instructions executed by processing circuitry 1620, and network interface 1640 communicates signals to any suitable node, such as a gateway, switch, router, Internet, Public Switched Telephone Network (PSTN), network nodes 115, radio network controllers or core network nodes 1600, etc.

Processing circuitry 1620 may include any suitable combination of hardware and software implemented in one or more modules to execute instructions and manipulate data to perform some or all of the described functions of the radio network controller or core network node 1600. In some embodiments, processing circuitry 1620 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1640 is communicatively coupled to processing circuitry 1620 and may refer to any suitable device operable to receive input for the network node, send output from the network node, perform suitable processing of the input or output or both, communicate to other devices, or any combination of the preceding. Network interface 1640 may include appropriate hardware (e.g., port, modem, network interface card, etc.) and software, including protocol conversion and data processing capabilities, to communicate through a network.

Other embodiments of the network node may include additional components beyond those shown in FIG. 16 that may be responsible for providing certain aspects of the network node's functionality, including any of the functionality described above and/or any additional functionality (including any functionality necessary to support the solution described above).

According to certain embodiments, a method in a wireless device may include:
determining whether a signal quality measurement for a signal transmitted between the wireless device and a network node associated with the first cell indicates a need for normal coverage or enhanced coverage in the first cell;
determining whether the wireless device is currently configured for the normal coverage mode or the enhanced coverage mode in the first cell;
selecting a set of resource requirements for the wireless device in the first cell, wherein:
a first set of resource requirements is selected when the signal quality measurement requires normal coverage and the configuration is for normal coverage;
a second set of resource requirements is selected when the signal quality measurement requires enhanced coverage and the configuration is for enhanced coverage;
a third set of resource requirements is selected when the signal quality measurement requires normal coverage and the configuration is for enhanced coverage;
a four set of resource requirements is selected when the signal quality measurement requires enhanced coverage and the configuration is for normal coverage.
   optionally, the method further includes: while operating according to the configuration, transmitting the signal from the wireless device to the network node;
   optionally, the method further includes: while operating according to the configuration, receiving the signal at the wireless device from the network node;
   optionally, the method further includes: selecting a set of resources from a plurality of sets of resources to meet wireless device requirements based on the selected set of requirements, such that:
     a first set of resources is selected if wireless device is configured for normal coverage and the signal quality measurement is greater than or equal to a first threshold;
     a second set of resources is selected if wireless device is configured for enhanced coverage and the signal quality measurement is less than or equal to a second threshold;
     a third set of resources is selected if wireless device is configured for normal coverage and the signal quality measurement is less than or equal to the second threshold; and
     a fourth set of resources is selected if wireless device is configured for enhanced coverage and the signal quality measurement is greater than or equal to the first threshold;
   optionally, the method further includes performing an operational task using the selected set of resources, wherein the operation task includes at least one of:
     transmitting the set of resource requirements to a network node
     adapting one or more requirements;
     sending random access;
     identifying a mismatch between the configuration of the wireless device and the signal quality measurement;
According to certain embodiments, a wireless device may include:
   processing circuitry, the processing circuitry configured to:
     determine whether a signal quality measurement for a signal transmitted between the wireless device and a network node associated with the first cell indicates a need for normal coverage or enhanced coverage in the first cell;
     determine whether the wireless device is currently configured for the normal coverage mode or the enhanced coverage mode in the first cell;

select a set of resource requirements for the wireless device in the first cell, wherein:
  a first set of resource requirements is selected when the signal quality measurement requires normal coverage and the configuration is for normal coverage;
  a second set of resource requirements is selected when the signal quality measurement requires enhanced coverage and the configuration is for enhanced coverage;
  a third set of resource requirements is selected when the signal quality measurement requires normal coverage and the configuration is for enhanced coverage;
  a four set of resource requirements is selected when the signal quality measurement requires enhanced coverage and the configuration is for normal coverage.
optionally, the processing circuitry is further configured to: while operating according to the configuration, transmit the signal from the wireless device to the network node;
optionally, the processing circuitry is further configured to: while operating according to the configuration, receive the signal at the wireless device from the network node;
optionally, the processing circuitry is further configured to select a set of resources from a plurality of sets of resources to meet wireless device requirements based on the selected set of requirements, such that:
  a first set of resources is selected if wireless device is configured for normal coverage and the signal quality measurement is greater than or equal to a first threshold;
  a second set of resources is selected if wireless device is configured for enhanced coverage and the signal quality measurement is less than or equal to a second threshold;
  a third set of resources is selected if wireless device is configured for normal coverage and the signal quality measurement is less than or equal to the second threshold; and
  a fourth set of resources is selected if wireless device is configured for enhanced coverage and the signal quality measurement is greater than or equal to the first threshold;
optionally, the processing circuitry is further configured to perform an operational task using the selected set of resources, wherein the operation task includes at least one of:
  transmitting the set of resource requirements to a network node
  adapting one or more requirements;
  sending random access;
  identifying a mismatch between the configuration of the wireless device and the signal quality measurement;

According to certain embodiments, method in a network node may include
  optionally, configuring a wireless device for normal coverage mode or enhanced coverage mode in a first cell;
  obtaining information from the wireless device, wherein the information indicates one of the following
    the signal quality measurement requires normal coverage and the wireless device is configured for normal coverage;
    the signal quality measurement requires enhanced coverage and the wireless device is configured for enhanced coverage;
    the signal quality measurement requires normal coverage and the wireless device is configured for enhanced coverage;
    the signal quality measurement requires enhanced coverage and the wireless device is configured for normal coverage;
  using the obtained information for performing one or more operational tasks;
  optionally, the one or more operational tasks comprises reconfiguring the UE with CE level;
  optionally, the one or more operational tasks comprises adapting scheduling in UL and/or DL;
  optionally, the one or more operational tasks comprises adapting measurement configuration;
  optionally, the signal quality measurement relates to a signal transmitted from the wireless device to the network node in the first cell;
  optionally, the signal quality measurement relates to a signal transmitted from the network node to the wireless device in the first cell.

According to certain embodiments, a network node may include:
  processing circuitry, the processing circuitry configured to:
    optionally, configure a wireless device for normal coverage mode or enhanced coverage mode in a first cell;
    obtain information from the wireless device, wherein the information indicates one of the following
      the signal quality measurement requires normal coverage and the wireless device is configured for normal coverage;
      the signal quality measurement requires enhanced coverage and the wireless device is configured for enhanced coverage;
      the signal quality measurement requires normal coverage and the wireless device is configured for enhanced coverage;
      the signal quality measurement requires enhanced coverage and the wireless device is configured for normal coverage;
    use the obtained information for performing one or more operational tasks;
  optionally, the one or more operational tasks comprises reconfiguring the UE with CE level;
  optionally, the one or more operational tasks comprises adapting scheduling in UL and/or DL;
  optionally, the one or more operational tasks comprises adapting measurement configuration;
  optionally, the signal quality measurement relates to a signal transmitted from the wireless device to the network node in the first cell;
  optionally, the signal quality measurement relates to a signal transmitted from the network node to the wireless device in the first cell.

According to certain embodiments, a method in a wireless device may include:
  determining a coverage enhancement level ($CE_X$) of the UE with respect to a first cell (cell1) using a first procedure (P1) at time t1;
  determining a coverage enhancement ($CE_Y$) level of the UE with respect to cell1 using a second procedure (P2) at time t2;

determining the difference between $CE_X$ and $CE_Y$; and
using the results of said determined difference for performing one or more operational tasks;
optionally performing the one or more operational tasks comprises transmitting the results to another node;
optionally, performing the one or more operational tasks comprises indicating a mismatch between $CE_X$ and $CE_Y$;
optionally, performing the one or more operational tasks comprises adapting one or more requirements;
optionally, performing the one or more operational tasks comprises sending random access;

According to certain embodiments, a wireless device may include:
  processing circuitry, the processing circuitry configured to:
    determining a coverage enhancement level ($CE_X$) of the UE with respect to a first cell (cell1) using a first procedure (P1) at time t1;
    determining a coverage enhancement ($CE_Y$) level of the UE with respect to cell1 using a second procedure (P2) at time t2;
    determining the difference between $CE_X$ and $CE_Y$;
    using the results of said determined difference for performing one or more operational tasks.
optionally performing the one or more operational tasks comprises transmitting the results to another node;
optionally, performing the one or more operational tasks comprises indicating a mismatch between $CE_X$ and $CE_Y$;
optionally, performing the one or more operational tasks comprises adapting one or more requirements;
optionally, performing the one or more operational tasks comprises sending random access;

According to certain embodiments, method in a network node may include
  optionally, configuring a UE with one of a plurality of coverage enhancement levels with respect to a first cell (cell1);
  obtaining information about results of determining the difference between:
    a coverage enhancement level ($CE_X$) of the UE with respect to a first cell (cell1) determined by the UE using a first procedure (P1); and
    a coverage enhancement ($CE_Y$) level of the UE with respect to cell1 determined by the UE using a second procedure (P2);
  using the obtained information for performing one or more operational tasks;
  optionally, performing the one or more operational tasks comprises reconfiguring the UE with CE level;
  optionally, performing the one or more operational tasks comprises adapting scheduling in UL and/or DL;
  optionally, performing the one or more operational tasks comprises adapting measurement configuration;

According to certain embodiments, a network node may include:
  processing circuitry, the processing circuitry configured to:
    optionally, configuring a UE with one of a plurality of coverage enhancement levels with respect to a first cell (cell1);
    obtaining information about results of determining the difference between:
      a coverage enhancement level ($CE_X$) of the UE with respect to a first cell (cell1) determined by the UE using a first procedure (P1); and
      a coverage enhancement ($CE_Y$) level of the UE with respect to cell1 determined by the UE using a second procedure (P2);
    using the obtained information for performing one or more operational tasks;
    optionally, performing the one or more operational tasks comprises reconfiguring the UE with CE level;
    optionally, performing the one or more operational tasks comprises adapting scheduling in UL and/or DL;
    optionally, performing the one or more operational tasks comprises adapting measurement configuration.

Certain embodiments of the present disclosure may provide one or more technical advantages. For example, certain embodiments may enable the wireless device to correctly determine the true coverage enhancement level of the wireless device with respect to a cell. Another technical advantage may be that certain embodiments enable efficient use of radio resources for transmitting and/or receiving channels. Still another technical advantage may be that certain embodiments enable the wireless device to more efficiently use its battery, and/or reduce processing. Certain embodiments may allow for wireless devices of reduced complexity. Another advantage still may be that certain embodiments enable the network node to determine if there is any mismatch between the wireless device coverage with respect to a cell as was determined by the network node and actual wireless device coverage being experienced by the wireless device with respect to that cell.

The following 3GPP contribution (R4-1701597, "Requirements under mismatch between configured CE mode and Es/Iot", 3GPP RAN4#82, Feb. 13-17, 2017) with change request to Technical Specification 36.133 v14.2.0 has been proposed:

3.6.1 Applicability of Requirements in This Specification Version
The requirements for TDD-FDD carrier aggregation are specified for two downlink and one uplink component carriers. The requirements are specified for both cases when the PCell belongs to TDD or FDD.
All the requirements for intra-band contiguous and non-contiguous CA apply under the assumption of the same uplink-downlink and special subframe configurations [16] in the PCell and SCell.
All the requirements for inter-band CA apply for the same uplink-downlink and special subframe configurations [16] in the PCell and SCell. Different uplink-downlink and special subframe configurations [16] in the PCell and SCell are supported for inter-band CA for UEs which:
do not support simultaneous reception and transmission for inter-band TDD CA specified in TS 36.331 [2], and
are compliant to the requirements specified in TS 36.101 for inter-band CA with uplink in one E-UTRA band and without simultaneous Rx/Tx.
All the inter-frequency requirements and requirements for measurements on deactivated carrier apply for the same uplink-downlink and special subframe configurations [16] in the PCell and SCell. Different uplink-downlink and special subframe configurations [16] in the PCell and SCell are supported for inter-frequency for UEs which:
do not support simultaneous reception and transmission for inter-band TDD CA specified in TS 36.331 [2], and are compliant to the requirements specified in TS 36.101 for inter-band CA with uplink in one E-UTRA band and without simultaneous Rx/Tx.
Requirements for E-UTRA carrier aggregation are applicable for the CA capable UE which has been configured with at least one downlink SCell, but:

up to four downlink CCs and up to two uplink CCs for inter-band carrier aggregation, or up to four downlink CCs and up to two uplink CCs for intra-band contiguous carrier aggregation, or up to four downlink CCs and one uplink CCs for inter-band carrier aggregation, or up to two downlink/uplink CCs intra-band contiguous and one downlink/uplink inter-band carrier aggregation, or up to two downlink CCs intra-band contiguous and one downlink inter-band and up to two uplink CCs for inter-band carrier aggregation, or up to two downlink CCs intra-band non-contiguous and one downlink inter-band and up to two uplink CCs for inter-band carrier aggregation, or up to three downlink CCs intra-band contiguous and one downlink intra-band non-contiguous and up to two uplink CCs intra-band contiguous for carrier aggregation, or two sub-blocks intra-band non-contiguous with two downlink CCs intra-band contiguous per sub-blocks and up to two uplink CCs intra-band contiguous for carrier aggregation, or two downlink CCs intra-band contiguous and three down link CCs inter-band and one uplink CC for carrier aggregation, or two downlink CCs intra-band contiguous and two downlink CCs intra-band contiguous and one downlink CC inter-band and one uplink CC for carrier aggregation, or up to two downlink CCs and up to two uplink CCs for intra-band non-contiguous carrier aggregation, or up to two downlink CCs and up to two uplink CCs for inter-band carrier aggregation, or up to two downlink CCs intra-band contiguous and one downlink inter-band and one uplink CC for carrier aggregation, or up to two downlink CCs intra-band non-contiguous and one downlink inter-band and one uplink CC for carrier aggregation, or up to two downlink CCs and one uplink CC for intra-band non-contiguous carrier aggregation.

Requirements for E-UTRA carrier aggregation for discovery signal measurements are applicable for CA capable UE which has been configured with at least one downlink SCell, but:

up to four downlink CCs and up to two uplink CCs for inter-band carrier aggregation, or up to four downlink CCs and up to two uplink CCs for intra-band contiguous carrier aggregation, or up to four downlink CCs and up to one uplink CCs for inter-band carrier aggregation, or up to two downlink/uplink CCs intra-band contiguous and one downlink/uplink inter-band carrier aggregation, or up to two downlink CCs intra-band contiguous and one downlink inter-band and up to two uplink CCs for inter-band carrier aggregation, or up to two downlink CCs intra-band non-contiguous and one downlink inter-band and up to two uplink CCs for inter-band carrier aggregation, or up to three downlink CCs intra-band contiguous and one downlink intra-band non-contiguous and up to two uplink CCs intra-band contiguous for carrier aggregation, or two sub-blocks intra-band non-contiguous with two downlink CCs intra-band contiguous per sub-blocks and up to two uplink CCs intra-band contiguous for carrier aggregation, or two downlink CCs intra-band contiguous and three down link CCs inter-band and one uplink CC for carrier aggregation, or two downlink CCs intra-band contiguous and two downlink CCs intra-band contiguous and one downlink CC inter-band and one uplink CC for carrier aggregation, or up to two downlink CCs and up to two uplink CCs for intra-band non-contiguous carrier aggregation, or up to two downlink CCs and up to two uplink CCs for inter-band carrier aggregation, or up to two downlink CCs intra-band contiguous and one downlink inter-band and one uplink CC for carrier aggregation, or up to two downlink CCs intra-band non-contiguous and one downlink inter-band and one uplink CC for carrier aggregation, or up to two downlink CCs and one uplink CC for intra-band non-contiguous carrier aggregation.

Requirements for E-UTRA carrier aggregation, where the PCell is FDD PCell or TDD PCell and the downlink SCell(s) follow the frame structure type 3 [16], are applicable for the CA capable UE, which is supporting band combinations according to 36.101 [5] and which has been configured with at least one downlink SCell but:

up to five downlink CCs and one uplink CCs for inter-band carrier aggregation.

The requirements for UE configured with eDRX_CONN cycle do not apply for CA requirements and dual connectivity requirements.

The requirements for a UE category 0 are derived assuming UE category 0 [31] and a single antenna receiver.

The requirements for UE category M1 are derived assuming: DL Category M1 and Uplink Category M1, operation in any LTE system bandwidth but with a channel bandwidth of 1.4 MHz and transmission bandwidth of 6 PRBs in downlink and uplink, and a single antenna receiver. DL UE category M1 and UL UE category M1 are defined in [31].

The requirements for normal coverage in idle mode shall apply provided the UE category M1 is with the radio condition that SCH Ês/Iot≥−6 dB and CRS Ês/Iot≥−6 dB.

The requirements for enhanced coverage in idle mode shall apply provided the UE category M1 is with the radio condition that SCH Ês/Iot≥−15 dB and CRS Ês/Iot≥−15 dB.

The requirements for CEMode A shall apply provided the UE category M1 is configured with CEMode A, SCH Ês/Iot≥−6 dB and CRS Ês/Iot≥−6 dB. The CEMode A and the number of repetition levels for different physical channels are defined in [3].

The requirements for CEMode B shall apply provided the UE category M1 is configured with CEMode B, SCH Ês/Iot≥−15 dB and CRS Ês/Iot≥−15 dB. The CEMode B and the number of repetition levels for different physical channels are defined in [3].

The requirements for CEMode A shall apply provided the UE category M1 is configured with CEMode B, SCH Ês/Iot≥−6 dB and CRS Ês/Iot≥−6 dB.

The requirements for CEMode B shall apply provided the UE category M1 is configured with CEMode A, SCH Ês/Iot≥−15 dB and CRS Ês/Iot≥−15 dB.

Requirements for E-UTRA ProSe Direct Discovery and E-UTRA ProSe Direct Communication are applicable for ProSe operation on either the uplink frequency of PCC, or SCC, or a non-serving carrier, but:

with ProSe operation limited to one carrier on a given subframe.

Requirements for interruptions due to ProSe Direct Discovery and/or ProSe Direct Communications specified in clause 7.16.3 apply, but:

with configured serving carriers of up to two downlink CCs, unless the UE is configured with reception gap for ProSe operation, and with configured serving carriers of up to two uplink CCs, unless the UE is configured with transmission gap for ProSe operation.

The requirements for UE category NB1 are derived assuming UE category NB1 and a single antenna receiver. UE category NB1 is defined in [31].

The requirements for normal coverage in idle mode shall apply provided the UE category NB1 is with the radio condition that NSCH $\hat{E}s/Iot \geq -6$ dB and NRS $\hat{E}s/Iot \geq -6$ dB.

The requirements for enhanced coverage in idle mode shall apply provided the UE category NB1 is with the radio condition that NSCH $\hat{E}s/Iot \geq -15$ dB and NRS $\hat{E}s/Iot \geq -15$ dB.

The measurement accuracy requirements in section 9.22 for intra-frequency and inter-frequency absolute NRSRQ accuracy for UE Category NB1 apply only in idle mode.

The measurement accuracy requirements in section 9.22 for intra-frequency and inter-frequency absolute NRSRP accuracy for UE Category NB1 apply also in idle mode.

The requirements for SRS carrier based switching shall apply when the UE capable of SRS carrier based switching is configured to perform SRS carrier based switching for transmitting SRS and/or RACH in one or more CCs in the same or different time resources.

Certain aspects of the impact of mismatch between configured CE mode and Signal quality in eMTC are now summarized (in R4-1701596, "Impact of mismatch between configured CE mode and Signal quality in eMTC", 3GPP RAN4#82, Feb. 13-17, 2017.). Different sets of RRM requirements for eMTC are defined in RRC connected state under CE Mode A and CE Mode B operations. The impact on UE behaviour of the mismatch between the configured CE mode and the actual signal quality at the UE may be considered.

Regarding the requirements applicability for different CE modes, the following rules are specified in section 3.6.1 regarding the conditions under which the UE shall meet requirements defined for CE Mode A (normal coverage) and for CE Mode B (enhanced coverage):

The requirements for CEMode A shall apply provided the UE category M1 is configured with CEMode A, SCH $\hat{E}s/Iot \geq -6$ dB and CRS $\hat{E}s/Iot \geq -6$ dB. The CEMode A and the number of repetition levels for different physical channels are defined in [3].

The requirements for CEMode B shall apply provided the UE category M1 is configured with CEMode B, SCH $\hat{E}s/Iot \geq -15$ dB and CRS $\hat{E}s/Iot \geq -15$ dB. The CEMode B and the number of repetition levels for different physical channels are defined in [3].

Based on the above rule the UE shall meet RRM requirements defined for normal coverage or for enhanced coverage when two conditions are met i.e.

Normal coverage: when 1) configured mode is CE Mode A and 2) SCH and CRS $\hat{E}s/Iot \geq -6$ dB Enhance coverage: when 1) configured mode is CE Mode B and 2) SCH and CRS $\hat{E}s/Iot \geq -15$ dB The network configures the UE CE mode A or with CE Mode B via RRC signalling on semi-static basis. This is typically done after setting up dedicated control channels. The network determines the CE mode typically based on the random access transmission procedure.

However channel conditions experienced at the UE can change over time due to for example change in the radio conditions, load, UE mobility etc. This can cause mismatch between the configured CE mode and the actual value of the SCH and CRS $\hat{E}s/Iot$ at the UE. Under several cases of such mismatch the UE is required to meet any RRM requirements. This in turn may result in the failure of several operations e.g. RLM, mobility etc.

The UE behaviour in terms of requirement applicability under different combinations of the network configured CE mode and the actual signal quality estimated at the UE is summarized in table 1. For the last two cases, which can occur, there is no UE behaviour defined.

TABLE 1

UE behaviour under different combinations of configured CE Mode and signal quality

| Cases | Configured CE Mode | Actual signal quality at UE | UE behaviour |
|---|---|---|---|
| 1 | CE Mode A | SCH and CRS $\hat{E}s/Iot \geq -6$ dB | UE shall meet RRM requirements for CE Mode A |
| 2 | CE Mode B | SCH and CRS $\hat{E}s/Iot \geq -15$ dB | UE shall meet RRM requirements for CE Mode A |
| 3 | CE Mode A | SCH and CRS $\hat{E}s/Iot \geq -15$ dB | Unspecified |
| 4 | CE Mode B | SCH and CRS $\hat{E}s/Iot \geq -6$ dB | Unspecified |

The unspecified UE behaviour under cases 3 and 4 is highly undesirable from network operation. This is because as stated under these cases (3 and 4) none of the RRM procedures will work. These cases may also lead to an undesirable UE behaviour e.g. excessively long measurement time, pre-mature radio link failure (RLF) etc. Therefore we suggest to specify the set of RRM requirements which the UE shall meet under cases 3 and 4. However it is not straight forward that which requirements the UE should meet under these cases.

In case 3, we propose that the UE should meet requirements corresponding to CE Mode B. This is because under low SINR (i.e. $\hat{E}s/Iot \geq -15$ dB) it would not be appropriate to expect the UE to meet CE mode A requirements which are more stringent compared CE Mode B requirements.

On the other hand in case 4, we propose that the UE should meet requirements corresponding to CE Mode A. This is because under higher SINR (i.e. $\hat{E}s/Iot \geq -6$ dB) the UE should be able to meet CE mode A requirements which are more stringent compared CE Mode B requirements.

TABLE 2

Proposed UE behaviour under undefined combinations of configured CE Mode and signal quality

| Cases | Configured CE Mode | Actual signal quality at UE | Proposed UE behaviour |
|---|---|---|---|
| 3 | CE Mode A | SCH and CRS $\hat{E}s/Iot \geq -15$ dB | UE shall meet RRM requirements for CE Mode B |
| 4 | CE Mode B | SCH and CRS $\hat{E}s/Iot \geq -6$ dB | UE shall meet RRM requirements for CE Mode A |

In conclusion, the UE behaviour in terms of requirement applicability for different combinations of the network configured CE mode and the actual signal quality ($\hat{E}s/Iot$) estimated at the UE has been analyzed. It is proposed to define the requirements applicability also for the following unspecified cases:

The requirements for CEMode B shall apply provided the UE category M1 is configured with CEMode A, SCH Ês/Iot≥−15 dB and CRS Ês/Iot≥−15 Db.

The requirements for CEMode A shall apply provided the UE category M1 is configured with CEMode B, SCH Ês/Iot≥−6 dB and CRS Ês/Iot≥−6 dB.

The corresponding Rel-13 CR entitled "Requirements under mismatch between configured CE mode and Ês/Iot" is based on the above stated proposals.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:

| Abbreviation | Explanation |
| --- | --- |
| ACK | Acknowledged |
| BS | Base station |
| BSC | Base station controller |
| BTS | Base transceiver station |
| CA | Carrier aggregation |
| CC | Component carrier |
| CGI | Cell global identity |
| CSG | Closed subscriber group |
| DAS | Distributed antenna system |
| DL | Downlink |
| DRX | Discontinuous reception |
| eNB | eNodeB |
| FDD | Frequency division duplex |
| HD-FDD | Half duplex FDD |
| M2M | machine to machine |
| MCG | Master cell group |
| MDT | Minimization of drive tests |
| MeNB | Master eNode B |
| MME | Mobility management entity |
| MSR | Multi-standard radio |
| NACK | Not acknowledged |
| OFDM | Orthogonal frequency division multiplexing |
| PCC | Primary component carrier |
| PCell | Primary Cell |
| PSCell | Primary SCell |
| PSC | Primary serving cell |
| RLM | Radio link monitoring |
| RNC | Radio Network Controller |
| RRC | Radio resource control |
| RRH | Remote radio head |
| RRU | Remote radio unit |
| RSRP | Reference Signal Received Power |
| RSRQ | Reference Signal Received Quality |
| RSSI | Received signal strength indication |
| RSTD | Reference signal time difference |

| Abbreviation | Explanation |
| --- | --- |
| Rx | Receiver |
| SCC | Secondary component carrier |
| SCell | Secondary Cell |
| SCG | Secondary Cell Group |
| SeNB | Secondary eNode B |
| SI | System information |
| SIB | System information block |
| SINR | Signal to interference and noise ratio |
| SON | Self-organizing networks |
| TDD | Time division duplex |
| Tx | Transmitter |
| UE | User equipment |
| UL | Uplink |

The invention claimed is:

1. A method in a wireless device comprises:
   determining a current coverage enhancement, CE, mode of the wireless device with respect to a first cell;
   determining an estimated signal quality of the wireless device with respect to the first cell; and
   performing an operational task selected from:
   (a) if the current CE mode is a normal CE mode and the estimated signal quality of the wireless device with respect to the first cell is greater than or equal to an upper threshold, continuing to operate the wireless device in the normal CE mode;
   (b) if the current CE mode is an enhanced CE mode and the estimated signal quality of the wireless device with respect to the first cell is greater than or equal to a lower threshold and less than the upper threshold, continuing to operate the wireless device in the enhanced CE mode;
   (c) if the current CE mode is the normal CE mode and the estimated signal quality of the wireless device with respect to the first cell is greater than or equal to the lower threshold and less than the upper threshold, reconfiguring the wireless device to operate in the enhanced CE mode; and
   (d) if the current CE mode is the enhanced CE mode and the estimated signal quality of the wireless device with respect to the first cell is greater than or equal to the upper threshold, continuing to operate the wireless device in the enhanced CE mode.

2. The method of claim 1, wherein the wireless device is configured to perform each of the operational tasks of (a) to (d).

3. The method of claim 1, further comprising performing an additional operational task selected from:
   performing a comparison of the current CE mode to an estimated CE mode appropriate for the estimated signal quality of the wireless device and transmitting a result of the comparison to a network node;
   identifying a mismatch between the current CE mode and an estimated CE mode appropriate for the estimated signal quality of the wireless device and transmitting an indication of the mismatch to a network node;
   adapting one or more requirements; and
   sending random access.

4. The method of claim 1, wherein determining the current CE mode of the wireless device comprises receiving an indication of the current CE mode from a network node.

5. The method of claim 1, further comprising
   if (a) is performed, selecting a first set of resources to meet normal CE mode requirements;

if (b) is performed, selecting a second set of resources to meet enhanced mode requirements;
if (c) is performed, selecting a third set of resources to meet enhanced mode requirements;
(d) is performed, selecting a fourth set of resources to meet enhanced mode requirements.

6. A wireless device comprises:
processing circuitry configured to:
   determine a current coverage enhancement, CE, mode of the wireless device with respect to a first cell;
   determining an estimated signal quality of the wireless device with respect to the first cell; and
   perform an operational task selected from:
      (a) if the current CE mode is a normal CE mode and the estimated signal quality of the wireless device with respect to the first cell is greater than or equal to an upper threshold, continuing to operate the wireless device in the annual CE mode;
      (b) if the current CE mode is an enhanced CE mode and the estimated signal quality of the wireless device with respect to the first cell is greater than or equal to a lower threshold and less than the upper threshold, continuing to operate the wireless device in the enhanced CE mode;
      (c) if the current CE mode is the normal CE mode and the estimated signal quality of the wireless device with respect to the first cell is greater than or equal to the lower threshold and less than the tipper threshold, reconfiguring the wireless device to operate in the enhanced CE mode; and
      (d) if the current CE mode is the enhanced CE mode and the estimated signal quality of the wireless device with respect to the first cell is greater than or equal to the upper threshold, continuing to operate the wireless device in the enhanced CE mode.

7. A wireless device comprises:
processing circuitry configured to:
   determine a current coverage enhancement, CE, mode of the wireless device with respect to a first cell;
   determining an estimated signal quality of the wireless device with respect to the first cell;
   perform an operational task selected from:
      (a) if the current CE mode is a normal CE mode and the estimated signal quality of the wireless device with respect to the first cell is greater than or equal to an upper threshold, continuing to operate the wireless device in the normal CE mode;
      (b) if the current CE mode is an enhanced CE mode and the estimated signal quality of the wireless device with respect to the first cell is greater than or equal to a lower threshold and less than the upper threshold, continuing to operate the wireless device in the enhanced CE mode;
      (c) if the current CE mode is the normal CE mode and the estimated signal quality of the wireless device with respect to the first cell is greater than or equal to the lower threshold and less than the upper threshold, reconfiguring the wireless device to operate in the enhanced CE mode; and
      (d) if the current CE mode is the enhanced CE mode and the estimated signal quality of the wireless device with respect to the first cell is greater than or equal to the upper threshold, continuing to operate the wireless device in the enhanced CE mode; and wherein the processing circuitry is further configured to perform the method of claim 1.

8. A method in a network node comprises: receiving, from a wireless device configured to operate in a first coverage enhancement, CE, mode with respect to a first cell, information indicating at least one of: (a) an estimated signal quality of the wireless device with respect to the first cell; and (b) reconfiguration of the wireless device from the first CE mode to a second CE mode with respect to the first cell; and performing one or more operational tasks based on the information.

9. The method of claim 8, further comprising: prior to obtaining the information transmitting to the wireless device, an indication to operate the wireless device according to the first CE mode.

10. The method of claim 8, wherein the information indicates the estimated signal quality of the wireless device while operating in the first CE mode; and performing the one or more operational tasks comprises determining a mismatch between the first CE mode and a coverage level required for the estimated signal quality.

11. The method of claim 8, wherein the information indicates the estimated signal quality of the wireless device while operating in the first CE mode; and performing the one or more operational tasks comprises determining whether the estimated signal quality requires a coverage level associated with the first CE mode or the second CE mode.

12. The method of claim 11, wherein determining whether the estimated signal quality requires a coverage level associated with the first CE mode or the second CE mode comprises: (a) if the first CE mode is a normal CE mode and the estimated signal quality of the wireless device with respect to the first cell is greater than or equal to an upper threshold, continuing to operate the wireless device in the normal CE mode.

13. The method of claim 12, further comprising: if (a) is performed, selecting a first set of resources to meet normal CE mode requirements; if (b) is performed, selecting a second set of resources to meet enhanced mode requirements, if (c) is performed, selecting a third set of resources to meet enhanced mode requirements; or if (d) is performed, selecting a fourth set of resources to meet enhanced mode requirements.

14. A network node comprises: processing circuitry, the processing circuitry configured to: receive, from a wireless device configured to operate in a first coverage enhancement, CE, mode with respect to a first cell, information indicating at least one of (a) an estimated signal quality of the wireless devie with respect to the first cell; and (b) a reconfiguration of the wireless device from the first CE mode to a second CE mode with respect to the first cell; and perform one or more operational tasks based on the information.

15. A network node comprises:
processing circuitry, the processing circuitry configured to:
   receive, from a wireless device configured to operate in a first coverage enhancement, CE, mode with respect to a first cell, information indicating at least one of:
      (a) an estimated signal quality of the wireless device with respect to the first cell; and
      (b) a reconfiguration of the wireless device from the first CE mode to a second CE mode with respect to the first cell; and perform one or more operational tasks based on the information; and wherein the processing circuitry is further configured to perform the method of claim 9.

* * * * *